(12) United States Patent
Bhardwaj et al.

(10) Patent No.: US 9,685,810 B1
(45) Date of Patent: Jun. 20, 2017

(54) FAST CHARGING OF BATTERIES

(71) Applicant: X Development LLC, Mountain View, CA (US)

(72) Inventors: Ramesh C. Bhardwaj, Fremont, CA (US); Taisup Hwang, Santa Clara, CA (US)

(73) Assignee: X Development LLC, Mountain View, CA (US)

(*) Notice: Subject to any disclaimer, the term of this patent is extended or adjusted under 35 U.S.C. 154(b) by 357 days.

(21) Appl. No.: 14/280,184

(22) Filed: May 16, 2014

(51) Int. Cl.
*H02J 7/04* (2006.01)
*H02J 7/16* (2006.01)
*H02J 7/00* (2006.01)
*B60L 11/18* (2006.01)

(52) U.S. Cl.
CPC ........... *H02J 7/0093* (2013.01); *B60L 11/185* (2013.01); *H02J 7/0052* (2013.01)

(58) Field of Classification Search
CPC .................................................... H02J 7/0093
USPC .......................................................... 320/139
See application file for complete search history.

(56) References Cited

U.S. PATENT DOCUMENTS

| | | | |
|---|---|---|---|
| 6,232,750 B1* | 5/2001 | Podrazhansky | H02J 7/0093 320/139 |
| 6,522,102 B1 | 2/2003 | Cheiky et al. | |
| 2012/0200266 A1 | 8/2012 | Berkowitz et al. | |
| 2013/0314054 A1 | 11/2013 | Bergqvist et al. | |
| 2014/0023888 A1* | 1/2014 | Fulop | H01M 2/30 429/50 |

\* cited by examiner

*Primary Examiner* — Edward Tso
*Assistant Examiner* — Ahmed Omar
(74) *Attorney, Agent, or Firm* — McDonnell Boehnen Hulbert & Berghoff LLP

(57) ABSTRACT

Disclosed are methods for intelligently charging a battery faster. In some embodiments, the method includes determining, by a computing device, a target state of charge (SOC) from a set of predefined SOCs, where at least one of the predefined SOCs is less than a 100% SOC. Further, the method includes determining, by the computing device, a state of a battery, where the state of the battery is indicative of one or more characteristics of the battery. Further, the method includes, based at least on the state of the battery, the computing device determining a pulse time and a rest time of a current for charging the battery to the target SOC. Yet further, the method may include the computing device charging the battery to the target SOC with the pulse time and the rest time of the current.

22 Claims, 18 Drawing Sheets

| Condition | Charge Current | | | | Charge Time | | |
|---|---|---|---|---|---|---|---|
| | Current [C] | Pulse Time [s] | Rest Time [s] | Avg. Current [C] | 50% SOC [min] | 80% SOC [min] | 100% SOC [min] |
| 1 | 2.00 | 60 | 20 | 1.50 | 20.1 | 32.8 | 80.6 |
| 2 | 1.50 | - | 0 | 1.50 | 20.3 | 34.5 | 88.9 |
| 3 | 1.50 | 60 | 10 | 1.29 | 23.7 | 38.4 | 91.0 |
| 4 | 1.50 | 60 | 30 | 1.00 | 29.4 | 46.6 | 92.8 |
| 5 | 1.50 | 60 | 60 | 0.75 | 40.4 | 61.0 | 110.3 |
| 6 | 0.70 | - | 0 | 0.70 | 44.2 | 70.7 | 138.0 |
| 7 | Multi-Step CC-CV | | | | 34.2 | 66.6 | 128.4 |

| Condition | Cycle | Capacity | Impedance | Pulse Current | Pulse Time | Rest Time |
|---|---|---|---|---|---|---|
| 1 | 0-100 | ≥ 95% | ≤ 110% | 2.0C | 60s | 20s |
| 2 | 0-100 | ≥ 95% | ≤ 150% | 1.5C | 60s | 10s |
| 3 | 0-100 | ≥ 95% | > 150% | 1.0C | 60s | 10s |
| 4 | 0-100 | ≥ 85% | ≤ 110% | 1.5C | 60s | 10s |
| 5 | 0-100 | ≥ 85% | ≤ 150% | 1.5C | 60s | 30s |
| 6 | 0-100 | ≥ 85% | > 150% | 1.0C | 60s | 30s |
| 7 | 0-100 | < 85% | ≤ 110% | 1.0C | 60s | 10s |
| 8 | 0-100 | < 85% | ≤ 150% | 1.0C | 60s | 30s |
| 9 | 0-100 | < 85% | > 150% | 0.7C | 60s | 60s |
| 10 | 101-300 | ≥ 95% | ≤ 110% | 1.5C | 60s | 20s |
| 11 | 101-300 | ≥ 95% | ≤ 150% | 1.0C | 60s | 10s |
| 12 | 101-300 | ≥ 95% | > 150% | 0.7C | 60s | 10s |
| 13 | 101-300 | ≥ 85% | ≤ 110% | 1.0C | 60s | 10s |
| 14 | 101-300 | ≥ 85% | ≤ 150% | 1.0C | 60s | 30s |
| 15 | 101-300 | ≥ 85% | > 150% | 0.7C | 60s | 30s |
| 16 | 101-300 | < 85% | ≤ 110% | 0.7C | 60s | 10s |
| 17 | 101-300 | < 85% | ≤ 150% | 0.7C | 60s | 30s |
| 18 | 101-300 | < 85% | > 150% | 0.5C | 60s | 60s |
| 19 | ≥ 301 | ≥ 95% | ≤ 110% | 1.5C | 60s | 30s |
| 20 | ≥ 301 | ≥ 95% | ≤ 150% | 1.0C | 60s | 30s |
| 21 | ≥ 301 | ≥ 95% | > 150% | 0.7C | 60s | 30s |
| 22 | ≥ 301 | ≥ 85% | ≤ 110% | 1.0C | 60s | 45s |
| 23 | ≥ 301 | ≥ 85% | ≤ 150% | 1.0C | 60s | 60s |
| 24 | ≥ 301 | ≥ 85% | > 150% | 0.7C | 60s | 60s |
| 25 | ≥ 301 | < 85% | ≤ 110% | 0.5C | 60s | 30s |
| 26 | ≥ 301 | < 85% | ≤ 150% | 0.5C | 60s | 45s |
| 27 | ≥ 301 | < 85% | > 150% | 0.5C | 60s | 60s |

FIG. 7

FAST CHARGING OF BATTERIES

BACKGROUND

Various types of electric systems and electronic devices are powered by rechargeable batteries. For example, electric vehicles, power tools, smart phones, tablet devices, digital music players, keyboards, human interface devices, and laptop computers, among many other types of devices are powered by rechargeable batteries. With a growing abundance of such systems and devices, the demand for efficiently charging the batteries used to power these systems and devices continues to grow as well.

In some embodiments, a rechargeable battery may be charged with a constant electric current. For example, the constant current may be supplied through the battery to recharge to the battery. Further, in some embodiments, a constant voltage may be supplied to the battery. For example, a constant voltage across may be applied across the terminals of the battery to recharge the battery.

In some embodiments, a battery may be charged with a constant current and a constant voltage, often referred to as CC-CV charging. In some embodiments, a battery may be charged by CC-CV charging in two different stages. For example, the first stage may involve charging the battery with a constant current and the second stage may involve charging the battery with a constant voltage. In particular, during the first stage, the battery may charge with the constant electric current flowing to the battery. Further, during this first stage, the voltage of the battery increases. Once the voltage reaches a threshold level, the charging operation is switched from charging with the constant current to charging with a constant voltage.

SUMMARY

Example embodiments herein disclose methods, computing devices, and/or systems for intelligently charging a battery faster while preserving the cycle life of the battery. In particular, a battery may be charged faster to a given state of charge (SOC) using an electric current with a pulse time and a rest time to charge the battery. Further, the battery may be charged faster using the current with the pulse time and the rest time while minimizing the degradation of the battery. As such, the methods, computing devices, and systems for intelligently charging the battery faster may sustain the performance of the battery and slow cell aging.

Disclosed herein are methods for determining, by a computing device, a target state of charge (SOC) from a set of predefined SOCs, where at least one of the predefined SOCs is less than a 100% SOC. In some embodiments, a method may include determining, by the computing device, a state of a battery, where the state of the battery is indicative of one or more characteristics of the battery. Further, the method may include, based at least on the state of the battery, the computing device determining a pulse time and a rest time of a current for charging the battery to the target SOC. Yet further, the method may include the computing device charging the battery to the target SOC with the pulse time and the rest time of the current.

Also disclosed herein are methods for determining, by an electric vehicle, a target state of charge (SOC) from a set of predefined SOCs, where at least one of the predefined SOCs is less than a 100% SOC. In some embodiments, a method may include determining, by the electric vehicle, a state of an electric vehicle battery, where the state of the electric vehicle battery is indicative of one or more characteristics of the electric vehicle battery. Further, the method may include, based at least on the state of the electric vehicle battery, the electric vehicle determining a pulse time and a rest time of a current for charging the electric vehicle battery to the target SOC. Yet further, the method may include the electric vehicle charging the electric vehicle battery to the target SOC with the pulse time and the rest time of the current.

Also disclosed are computing devices and/or systems with a processor and a non-transitory computer-readable medium having stored thereon program instructions that when executed by the processor cause the computing device to perform a set of functions. In some embodiments, the set of functions include determining a target state of charge (SOC) from a set of predefined SOCs, where at least one of the predefined SOCs is less than a 100% SOC. Further, the functions may include determining a state of a battery, where the state of the battery is indicative of one or more characteristics of the battery. Yet further, the functions may include, based at least on the state of the battery, determining a pulse time and a rest time of a current for charging the battery to the target SOC. In addition, the functions may include charging the battery to the target SOC with the pulse time and the rest time of the current.

Also disclosed are non-transitory computer-readable mediums having stored thereon program instructions that when executed by a processor cause performance of a set of functions in connection with a charger device. In some embodiments, the set of functions may include determining a target state of charge (SOC) from a set of predefined SOCs, where at least one of the predefined SOCs is less than a 100% SOC. Further, the functions may include determining a state of a battery, where the state of the battery is indicative of one or more characteristics of the battery. Yet further, the functions may include, based at least on the state of the battery, determining a pulse time and a rest time of a current for charging the battery to the target SOC. In addition, the functions may include the charger device charging the battery to the target SOC with the pulse time and the rest time of the current.

Also disclosed are non-transitory computer-readable mediums having stored thereon program instructions that when executed by a processor cause performance of a set of functions in connection with an electric vehicle battery. In some embodiments, the set of functions may include determining a target state of charge (SOC) from a set of predefined SOCs, where at least one of the predefined SOCs is less than a 100% SOC. Further, the functions may include determining a state of the electric vehicle battery, where the state of the electric vehicle battery is indicative of one or more characteristics of the electric vehicle battery. Yet further, the functions may include, based at least on the state of the electric vehicle battery, determining a pulse time and a rest time of a current for charging the electric vehicle battery to the target SOC. In addition, the functions may include charging the electric vehicle battery to the target SOC with the pulse time and the rest time of the current.

In addition, disclosed is a system that may include a means for determining a target state of charge (SOC) from a set of predefined SOCs, where at least one of the predefined SOCs is less than a 100% SOC. Further, the system may include means for determining a state of a battery, where the state of the battery is indicative of one or more characteristics of the battery. Yet further, the system may include means for, based at least on the state of the battery, determining a pulse time and a rest time of a current for charging the battery to the target SOC. In addition, the system may include means for charging the battery to the target SOC with the pulse time and the rest time of the current.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 5A illustrates example conditions for charging a battery, in accordance with some embodiments.

FIG. 7 illustrates example conditions for charging a battery based on characteristics of the battery, in accordance with some embodiments.

DETAILED DESCRIPTION

Figure 1A:
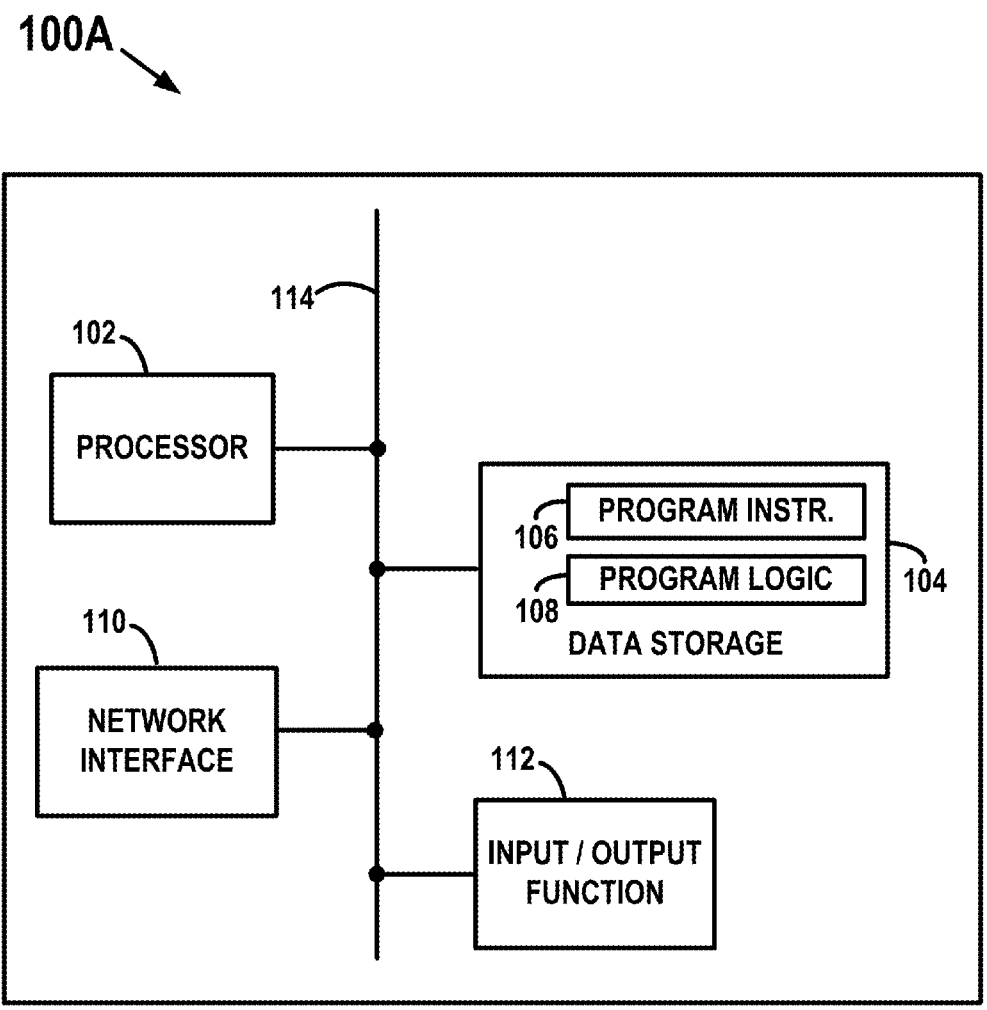
FIG. 1A is a block diagram of a computing device, in accordance with some embodiments.

Example methods, computing devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the detailed description herein, reference is made to the accompanying figures. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations contemplated herein.

I. OVERVIEW

In some embodiments, rechargeable batteries may used to power a variety of computing devices and systems, ranging from portable electronic devices to electric systems. In particular, a rechargeable battery may be used to power a portable electronic device such a smartphone, and further, a rechargeable battery may be used to power an electric system such as an electric vehicle.

For example, a battery may be used to power an electric vehicle travelling from San Francisco to Los Angeles. Consider that halfway between San Francisco and Los Angeles, the battery of the electric vehicle may need to be recharged in order to continue on to Los Angeles. As a general matter, it may take approximately eight or more hours to recharge the battery back to a full charge, e.g., to a 100% state of charge (SOC). However, from a practical standpoint, charging the battery for eight or more hours may be undesirable and/or burdensome to the driver. In particular, the driver may wish to avoid waiting eight hours in a location between San Francisco and Los Angeles, just to recharge the battery of the electric vehicle. Further, the driver may wish to avoid a total time of approximately sixteen hours for travelling from San Francisco to Los Angeles, e.g., eight hours for charging the battery plus eight hours of driving.

In some embodiments, increasing the rate of charging the battery may charge the battery faster. For example, considering the scenario above, by charging the battery with a standard rate, such as a 1C rate, it may take approximately the eight or more hours to recharge the battery of the electric vehicle to the 100% SOC. However, by charging the battery with a higher rate, such as a 1.5C rate, it may take significantly less time to charge the battery. For example, by charging the battery with the 1.5C rate, it may take only one to two hours to charge the battery to a 100% SOC.

Yet, as a general matter, increasing the rate of charging the battery may decrease the cycle life of the battery, e.g., the number of charge cycles during the life of the battery. From a practical standpoint, decreasing the cycle life of the battery may also be undesirable and/or burdensome to a driver that owns the electric vehicle. In particular, considering the scenario above, charging the battery at the 1.5C rate may reduce the cycle life of the battery to approximately 400 to 600 cycles. As such, the driver of the electric vehicle would potentially need to replace the battery of the electric vehicle every 1 to 2 years, which would greatly increase the cost associated with owning the electric vehicle, possibly making it economically infeasible to own the car.

Disclosed herein are example embodiments for intelligently charging a battery faster while preserving the cycle life of the battery, possibly transforming the landscape of electric vehicle transportation. For example, considering the scenarios above, by charging the battery of the electric vehicle using a pulsed current with a 1.5C rate, it may take 20 minutes to charge to a 50% target SOC and/or 33 minutes to 80% target SOC, while maintaining the cycle life of the battery to approximately 1,000 to 1,500 cycles. As such, the driver may travel from San Francisco to Los Angeles within a reasonable time frame, e.g., under 9 hours. Yet further, the cycle life may be preserved such that the battery of the electric vehicle may last for approximately 4 to 8 years before a replacement battery may be necessary.

It should be noted that the example embodiments for intelligently charging a battery may be pertinent to various other applications. For example, consider another scenario such that a user is charging the battery of a smartphone at an airport. In such instances, the user may need to board an airplane in thirty minutes and there may not be enough time to charge to the 100% SOC. In some instances, the user may wish charge the battery of the smartphone at the 1.5C rate to charge the battery faster. Yet, as noted above, simply increasing the rate to charge the battery may lead to battery degradation, thereby decreasing the cycle life of the battery. Thus, the battery may be charged using a pulsed current with a 1.5C rate to charge to a 50% target SOC in 20 minutes before the user may need to board the flight. As such, the battery may be charged faster and the cycle life of the battery may be preserved.

II. INTRODUCTION

In some embodiments, various methods, processes, and/or functions may be used to charge a battery. As noted, an electric current (also referred to herein as a "pulsed current", a "constant current", and/or a "current") may be supplied to a battery for purposes of charging the battery. Further, in some embodiments, an effective method for charging a given battery may be a less effective method for charging a different battery, perhaps if the two batteries have different capacities. For example, an electric current may be sufficient for charging a standard density battery (e.g., lithium or lithium-ion battery). However, this electric current may be insufficient for charging a battery with a high energy density (also referred to herein as a "high-density battery"). In such instances, charging the high-energy density battery using this current may take substantially longer than it the time takes to charge the standard density battery.

Yet, in some embodiments, a high-density battery may have a number of advantages. For instance, a high-density battery may provide a more efficient power solution for portable electronic devices. In particular, the high-density battery may be smaller than other types of batteries while having a greater energy density. As such, these batteries may enable a reduction in the size of portable electronic devices, allow for additional board space, and/or reduce associated costs. Thus, disclosed herein are methods, processes, and/or functions to charge various types of batteries faster, including high-density batteries. Thus, the terms "battery" and "batteries" disclosed herein are non-limiting terms referring to various types of batteries from low-density batteries, standard density batteries, and/or high-density batteries, among other types of batteries.

In some embodiments, charging a battery faster may introduce a number of challenges. For example, increasing the charging rate may adversely impact performance of the battery (e.g., charging and discharging the battery). Further, in some instances, increasing the charging rate may also accelerate cell aging and decrease the cycle life of the battery. As such, disclosed herein are methods, processes, and/or functions for charging various types of batteries faster while intelligently balancing such adverse impacts on the battery.

In some embodiments, the charging rates of batteries may vary. In some instances, the charging rates may vary depending on the capacity of the battery (possibly referred to herein as the "discharge capacity" of the battery). For example, the rate for charging a standard density battery may differ from the rate for charging a high-density battery. Yet, a standardized charging rate for charging batteries may be referred to as a "C rate". The C rate may be a standardized rate for charging or discharging a battery depending on the capacity of the battery or its battery cell(s). For example, a battery with a capacity of 690 mAh may have a 1C rate of 690 mA. Yet further, a higher-density battery with a capacity of 700 mAh may have a 1C rate of 700 mA.

In some embodiments, using the 1C rate of 690 mA may correspond to providing 1 hour of run time such that the battery may power a device or a system for one hour. Further, the 1C rate may drop the battery voltage from a maximum voltage, e.g., 4.35 volts, to a minimum voltage, e.g., 3 volts, after the 1 hour of run time, among other possibilities.

In some embodiments, the C rate may identify the rates for charging batteries, without further identifying additional parameters of the batteries. For example, as noted, a 1C rate for charging the battery with a capacity of 690 mAh is 690 mA and yet, the 1C rate for charging the battery with a capacity of 700 mAh is 700 mA. As such, the charging rates may simply be referred to as the "1C" rate, without further mentioning the capacity of each battery (in mAh) and the rate for charging the battery (in mA). As such, for additional examples, a 1.3C rate for charging the battery with the capacity of 690 mAh is 890 mA (1.3*690 mA) and further, the 1.3C rate for charging the battery with the capacity of 700 mAh is 910 mA (1.3*700 mA). In these examples, both charging rates may simply be referred to as a 1.3C rate.

It should be noted that charging a battery with the 1.3C rate generally charges the battery faster than the 1C rate. Yet, as noted in the scenarios above, charging the battery with the higher 1.3C rate may adversely impact the battery's performance, accelerate cell aging, and/or decrease the cycle life of the battery.

III. EXAMPLE COMPUTING DEVICE

In some embodiments, an example computing device may be helpful to understand aspects of the disclosure herein. FIG. 1A is a block diagram of a computing device, in accordance with some embodiments. Computing device 100A illustrates one or more of the functional elements that may be found in a device arranged to operate in accordance with one or more embodiments described herein. For example, computing device 100A may be a portable electronic device configured to charge a battery using one or more charging methods described herein. In particular, computing device 100A may be powered by a battery that may be charged by one or more charging methods described herein. Further, computing device 100A may be a charging device configured to charge a battery using one or more charging methods described herein, among other possibilities.

Computing device 100A may include processor 102, data storage 104, network interface 110, and input/output function 112, all of which may be linked together by a system bus, network, and/or other connection mechanism 114. Processor 102 may include one or more general purpose microprocessors, central processing units (CPUs), digital signal processors also known as DSPs, and/or dedicated processors. Processor 102 may also be coupled to application specific integrated circuits also known as ASICs (not shown in FIG. 1A), possibly integrated in whole or in part with computing device 100A.

Data storage 104 may include memory and/or other storage components, such as optical, magnetic, organic and/or other memory disc storage, which can be volatile and/or non-volatile, internal and/or external, and integrated in whole or in part with processor 102. Data storage 104 may be arranged to contain (i) program instructions 106 and (ii) program logic 108, executable by processor 102. Data storage 104 may also store data that may be manipulated by processor 102 to carry out the various methods, processes, or functions described herein.

In some embodiments, these methods, processes, and/or functions can be implemented using hardware, firmware, software, and/or any combination of hardware, firmware, and/or software. Therefore, data storage 104 may include a physical, tangible, and/or non-transitory computer-readable medium, having stored thereon program instructions that, upon execution by one or more processors, cause computing device 100A to carry out any of the methods, processes, or functions disclosed in this specification or the accompanying drawings.

Although these components are described herein as separate data storage elements, the elements could just as well be physically integrated together or distributed in various other ways. For example, program instructions 106 may be maintained in data storage 104 separate from program logic 108, for updating and/or referencing by program logic 108.

Network interface 110 may take the form of a wire line connection, such as an Ethernet, Token Ring, or T-carrier connection. Network interface 110 may alternatively take the form of a wireless connection, such as Wi-Fi, wireless USB, BLUETOOTH®, or a wide-area wireless connection. However, other forms of physical layer connections and other types of standard or proprietary communication protocols may be used over network interface 110. Furthermore, network interface 110 may comprise multiple physical communication interfaces.

Input/output function 112 may facilitate user interaction with example computing device 100A. Input/output function 112 may comprise multiple types of input devices, such as a keyboard, a mouse, a touch screen, a microphone and/or any other device that is capable of receiving input from a user. Similarly, input/output function 112 may allow for one or more connections with multiple types of devices and/or systems. In some instances, such devices and/or systems may be another computing device, a charger device, and/or a battery charger for providing a current and/or a voltage for charging a battery. Further, input/output function 112 may include a display, one or more light emitting diodes (LEDs), a speaker, or any other device that is capable of providing output that may be discernible to a user, possibly indicative of a state of charge (SOC) of a battery, that a target SOC has been reached, and/or a threshold of the battery's cycle life has been reached or exceeded. Additionally or alternatively, example computing device 100A may support remote access from another device, via network interface 110 or via another interface (not shown), such an RS-132 or Universal Serial Bus (USB) port.

It should be understood that the examples of a computing device are provided for illustrative purposes. Further, in addition to and/or alternatively to the examples above, other combinations and/or sub combinations of a computing device, charger device, and/or a battery charger may also exist, amongst other possibilities, without departing from the scope of the embodiments herein.

IV. EXAMPLE SERVER

Figure 1B:
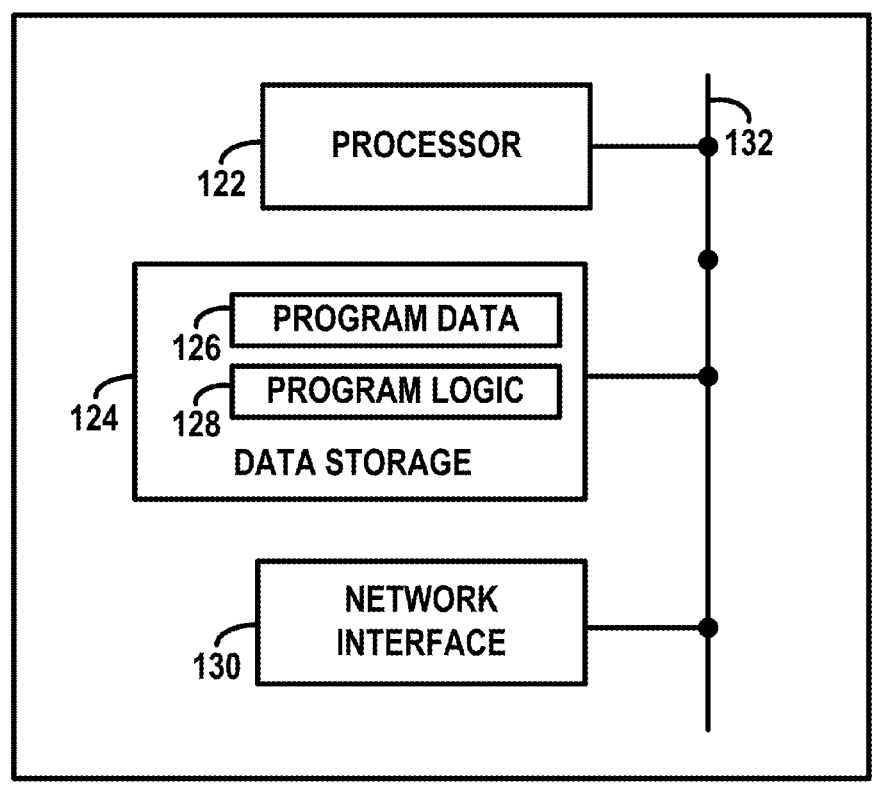
FIG. 1B is a block diagram of a server, in accordance with some embodiments.

FIG. 1B is a block diagram of a server, in accordance with some embodiments. As shown in FIG. 1B, server 100B may include processor 122, data storage 124 including program data 126 and program logic 128, and network interface 130, all of which may be linked together by a system bus, network, and/or other connection mechanism 132. Processor 122, data storage 124, program data 126, program logic 128, and network interface 130 may be configured and/or arranged similar to processor 102, data storage 104, program instructions 106, program logic 108, and network interface 110, respectively, as described above with respect to computing device 100A.

Data storage 124 may contain information used by server 100B in operation. For example, data storage 124 may include program instructions executable by processor 122 for charging a battery including, but not limited to, charging a battery with respect to FIG. 2 below. As another example, data storage 124 may contain various design logic and/or design data used for charging a battery, such as the logic and data described below with respect to FIG. 2. Generally, data storage 124 may contain information used by server 100B to provide information accessible by various devices, such as computing device 100A. For example, server 100B may provide various currents for charging a battery. In some instances, server 100B may provide example conditions for charging a battery, as described below in relation to FIGS. 5A through 8B. Further, server 100B may provide example currents for charging a battery, as described below in relation to FIGS. 4 through 9B.

Figure 1C:
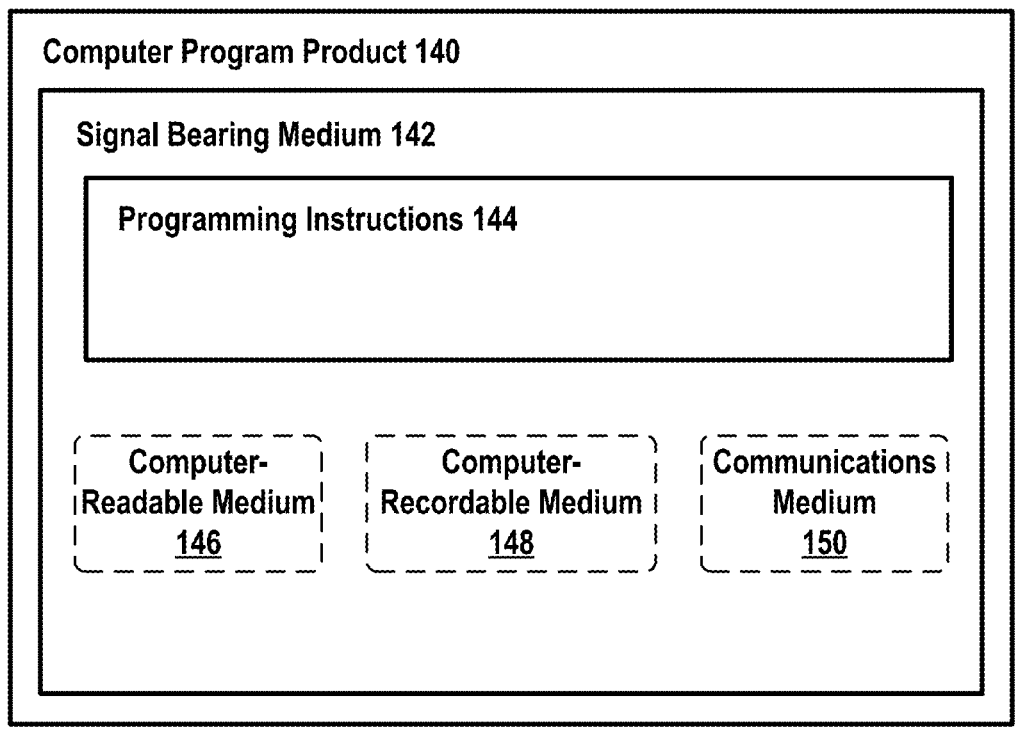
FIG. 1C is a block diagram of a computer-readable medium, in accordance with some embodiments.

As noted above, in some embodiments, the disclosed methods may be implemented by computer program instructions encoded on a physical and/or non-transitory computer-readable storage media in a machine-readable format, or on other physical and/or non-transitory media or articles of manufacture. FIG. 1C is a block diagram of computer-readable medium, in accordance with some embodiments. Further, FIG. 1C may be a schematic illustrating a conceptual partial view of an example computer program product that includes a computer program for executing a computer process on computing device 100A and/or server 100B.

In one embodiment, the example computer program product 140 is provided using signal bearing medium 142. Signal bearing medium 142 may include one or more programming instructions 144 that, when executed by one or more processors may provide functionality or sub-functionality as described herein. In some examples, the signal bearing medium 142 may encompass computer-readable medium 146, such as, but not limited to, a hard disk drive, a Compact Disc (CD), a Digital Video Disk (DVD), a digital tape, memory, etc. In some implementations, signal bearing medium 142 may encompass a computer recordable medium 148, such as, but not limited to, memory, read/write (R/W) CDs, R/W DVDs, etc.

In some implementations, signal bearing medium 142 may encompass communications medium 150, such as, but not limited to, a digital and/or an analog communication medium (e.g., a fiber optic cable, a waveguide, a wired communications link, a wireless communication link, etc.). Thus, for example, signal bearing medium 142 may be conveyed by a wireless form of communications medium 150. It should be understood, however, computer-readable medium 146, computer-recordable medium 148, and communications medium 150 as contemplated herein are distinct mediums and that, in any event, computer-readable medium 148 may be a physical and/or a non-transitory computer-readable medium.

Programming instructions 144 may be, for example, computer executable and/or logic implemented instructions. In some examples, computing device 100A of FIG. 1A may be configured to provide various operations, functions, or actions in response to programming instructions 144 conveyed to computing device 100A by one or more of computer-readable medium 146, computer recordable medium 148, and/or communications medium 150.

The physical and/or non-transitory computer-readable medium could also be distributed among multiple data storage elements, which could be remotely located from each other. The computing device that executes some or all of the stored instructions could be a computing device such as computing device 100A illustrated in FIG. 1A. In addition, the computing device that executes some or all of the stored instructions could be another computing device, such as a server, for instance server 100B illustrated in FIG. 1B.

V. EXAMPLE METHODS FOR CHARGING A BATTERY

As noted, example embodiments herein disclose methods, computing devices, and/or systems for intelligently charging a battery faster while preserving the cycle life of the battery. In particular, a battery may be charged faster to a given state of charge (SOC) using an electric current with a pulse time and a rest time to charge the battery. Further, the battery may be charged faster using the current with the pulse time and the rest time while also preserving the cycle life of the battery. As such, the methods, computing devices, and systems for intelligently charging the battery faster may sustain the performance of the battery and slow cell aging.

A. Determining A Target State of Charge (SOC)

Figure 2:
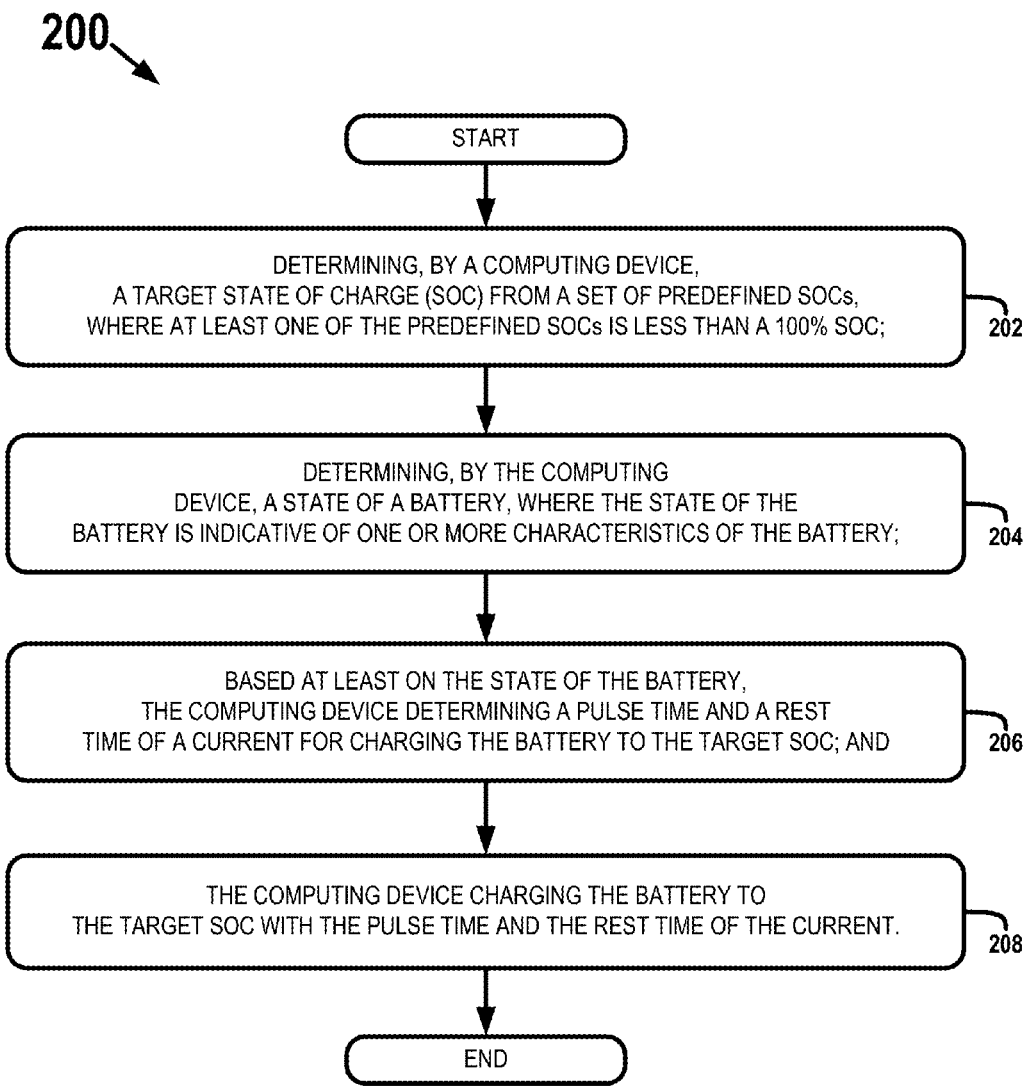
FIG. 2 is a flowchart describing a method for charging a battery, in accordance with some embodiments.

FIG. 2 is a flowchart describing a method for charging a battery, in accordance with some embodiments. As shown, method 200 begins at block 202 with determining, by a computing device, a target state of charge (SOC) from a set of predefined SOCs, where at least one of the predefined SOCs is less than a 100% SOC. The target SOC may be determined from a set of predefined SOCs, for example, by computing device 100A described above in relation to FIG. 1A. Further, the target SOC may be determined from the set of predefined SOCs, for example, by server 100B described in relation to FIG. 1B. Yet further, the target SOC may be determined from the set of predefined SOCs, for example, possibly stored on computer program product 140 in relation to FIG. 1C.

Figure 3:
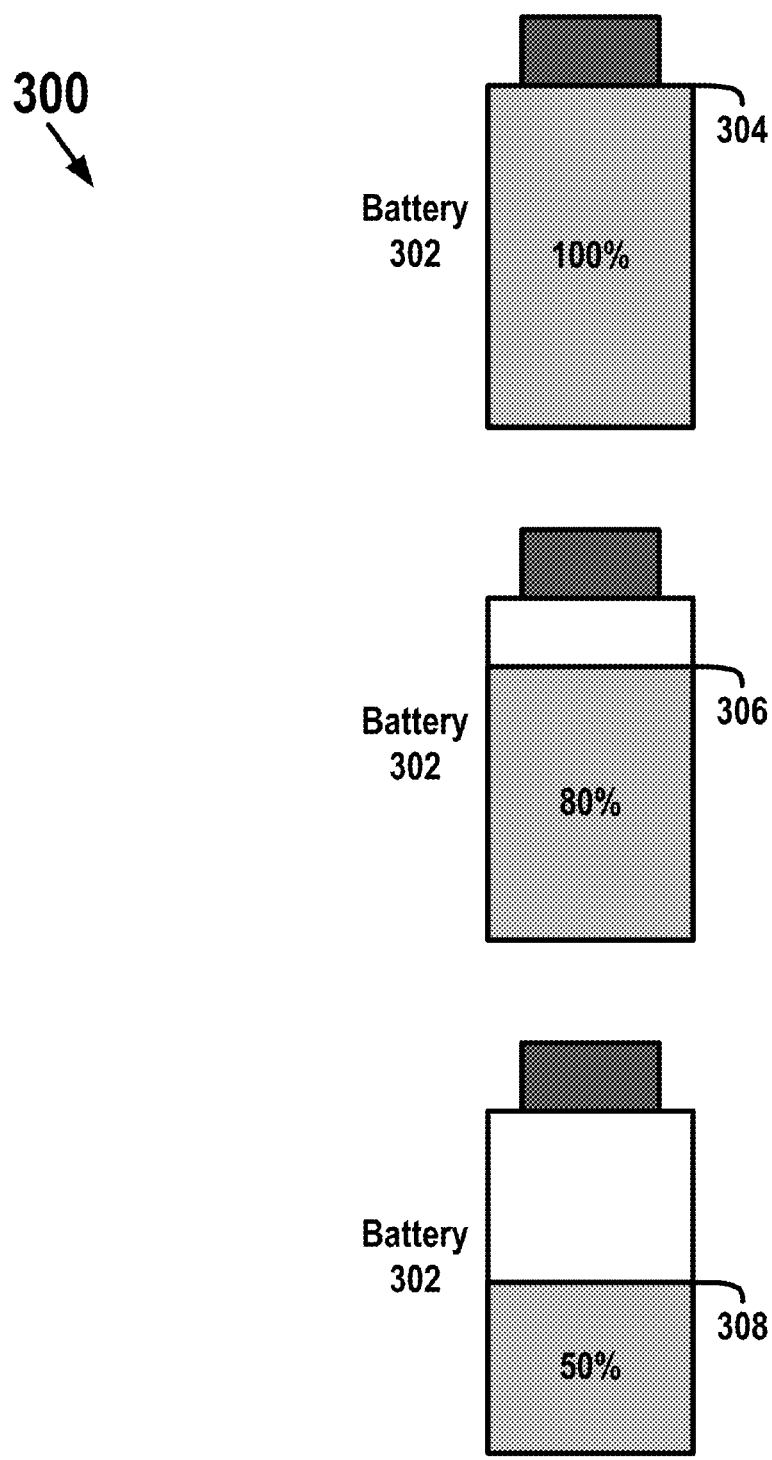
FIG. 3 illustrates examples of a state of charge (SOC), in accordance with some embodiments.

FIG. 3 illustrates examples of a state of charge (SOC), in accordance with some embodiments. As shown in scenario 300, SOCs 304, 306, and 308 of battery 302 may be provided. In some embodiments, battery 302 may be a battery used to power a computing device such as a smart phone. Further, in some embodiments, battery 302 may be battery used to power an electrical system such as an electric vehicle. Indications of SOCs 304, 306, and 308 of battery 302 may be provided in any of the manners described above in relation to FIGS. 1A through 1C. For example, input/output function 112 of computing device 100A may display indications of SOCs 304, 306, and 308 of battery 302, possibly as the power in battery 302 decreases over time. Further, indications of SOCs 304, 306, and 308 may be sent by network interface 110 and server 100B may receive the indications through network interface 130, among other possibilities. Yet further, SOCs 304, 306, and 308 may be a set of predefined SOCs, for example, possibly stored on computer program product 140 in relation to FIG. 1C.

In some embodiments, SOC 304 may correspond to a 100% SOC indicative of battery 302 being fully charged or approximately fully charged. Further, SOC 306 may correspond to an 80% SOC indicative of battery 302 being 80% charged. Yet further, SOC 308 may correspond to a 50% SOC indicative of battery 302 being halfway charged. It should be noted that other SOCs are also possible such as an SOC between an 80% and a 100% SOC, an SOC between a 50% SOC and an 80% SOC, and a SOC that is less than a 50% SOC.

In some embodiments, a target SOC may be determined for charging a battery. Further, in some embodiments, the target SOC may be determined from a set of predefined SOCs, where at least one predefined SOC is less than a 100% SOC. For example, consider a scenario such that battery 302 may have a 50% SOC corresponding to SOC 308. In some instances, the target SOC for charging battery 302 may be determined to be an 80% SOC corresponding to SOC 306. In particular, the target SOC may determined from a set of predefined SOCs, possibly ranging from the 50% SOC to the 80% SOC. As such, the set of predefined SOCs may be any SOC less than the 100% SOC corresponding to SOC 304.

In some embodiments, the time it takes to charge a battery to the target SOC may vary. For example, it may take 20 minutes to charge battery 302 to a 50% target SOC corresponding to SOC 308. Further, it may take 30 minutes to charge battery 302 to an 80% target SOC corresponding to SOC 306. Yet further, it may take 80 minutes to charge battery 302 to a target 100% SOC corresponding to SOC 308. As such, the time to charge battery 302 may vary based on the target SOC. Further, in some instances, the time it takes to charge a battery to the target SOC may vary based on the state of the battery. Yet further, the state of the battery may be determined, for example, in any of the manners described below in relation to block 204 of FIG. 2.

In some embodiments, the target SOC may be determined based on input data, possibly indicative of a time period available to charge a battery. In particular, based on the available time period, the target SOC may be determined from a set of predefined SOCs. For example, referring back to FIG. 1A, input/output function 112 of computing device 100A may receive input data indicative of a target SOC, possibly by a user of computing device 100A.

From a practical standpoint, consider a scenario in which a user has a limited time to charge computing device 100A, which may be a smart phone for purposes of this scenario. In particular, the user may be charging the battery of computing device 100A at an airport. Further, the user may need to board an airplane in thirty minutes and there may not be enough time to charge the battery of computing device 100A to a 100% SOC. Yet, the phone may be charged to a 50% SOC within the thirty minutes available before boarding the airplane. As such, the user may enter the available time period of thirty minutes to charge computing device 100A into the graphical user interface (GUI) of computing device 100A, possibly through input/output function 112. As such, the computing device 100A may determine a target SOC of approximately a 50% SOC for charging the battery of computing device 100A.

In some embodiments, the target SOC may be determined based on other input data, possibly indicative of a desired time period for powering a computing device. In particular, based on this desired time period, the target SOC may be determined from a set of predefined SOCs. For example, considering the scenario above, the user may wish to charge computing device 100A such that computing device 100A may be operable for a given duration of time. In particular, perhaps the flight is only a one-hour flight and a 15% SOC is sufficient to power computing device 100A for the one-hour duration. As such, the user may enter the desired time period of one hour for powering computing device 100A into the GUI of computing device 100A, possibly through input/output function 112. As such, computing device 100A may determine a target SOC of approximately a 15% SOC for charging the battery of computing device 100A.

In some embodiments, the target SOC may be determined for an electric vehicle battery. For example, consider a scenario of charging an electric vehicle battery configured to power an electric vehicle from a first location, e.g., San Francisco, to a second location, e.g., Los Banos, Calif. In some instances, the electric vehicle may determine the distance from San Francisco to Los Angeles to be 120 miles. As such, the electric vehicle may determine an approximate 80% to 90% target SOC to power the electric vehicle from San Francisco to Los Banos, possibly to recharge the electric vehicle battery at Los Banos.

In some instances, the target SOC may be determined based on a time period for the electric vehicle to travel from the first location, e.g., San Francisco, to the second location, e.g., Los Banos. For example, the electric vehicle may determine that it takes approximately 2 hours or more to travel from San Francisco to Los Banos, possibly based on traffic conditions. As such, the electric vehicle may determine an approximate 85% to 95% SOC to power the electric vehicle from San Francisco to Los Banos.

B. Determining A State of the Battery

The method 200 continues at block 204 with determining, by the computing device, a state of a battery, where the state of the battery is indicative of one or more characteristics of the battery. The state of the battery may be determined, for example, by computing device 100A described above in relation to FIG. 1A. Further, information regarding the state of the battery may be sent through network interface 110 and server 100B may receive the information through network interface 130, among other possibilities. As such, the state of the battery may be determined, for example, by server 100B described above in relation to FIG. 1B. In some embodiments, computing device 100A may determine the state of the battery based on further determining one or more characteristics of the battery.

In some embodiments, one or more characteristics of the battery may include a number of charging cycles completed by the battery. In some instances, a single charging cycle of a battery may correspond to charging the battery to a given SOC and dissipating the power from the battery to a different SOC charge. For example, a single charging cycle may correspond to charging the battery to approximately a 100% SOC and dissipating the power from the battery to approximately a 10% SOC or lower, among other possibilities. In particular, referring back to FIG. 3, a single charging cycle may correspond to charging battery 302 to SOC 304 and dissipating the power from battery 302 to approximately lower than SOC 308. In some instances, a single charging cycle may correspond to charging the battery to increase the SOC charge by at least 5% and dissipating the power by at least 5%, among other possibilities.

In some embodiments, the computing device may determine a number of charging cycles completed by the battery. For example, the computing device may include a counter for counting the number of times the battery is charged. In some instances, the computing device may count the number of times that the SOC charge of the battery is increased. Further, in some instances, the computing device may count the number of times that the SOC charge of the battery is increased by a given threshold value. Further, the computing device may count the number of times the battery is increased and decreased by the given threshold value. For example, the computing device may count the number of times that the battery is increased by approximately a 5% SOC and the power of the battery is decreased by approximately a 5% SOC, among other possibilities.

In some embodiments, one or more characteristics of the battery may include a capacity of the battery (also referred to herein as the "discharge capacity" of the battery). In some instances, the capacity of the battery may be described as a percentage. Further, in some instances, the capacity of the battery may be described as percentage capacity of a maximum capacity, where the maximum capacity may be the highest capacity that a given battery may have throughout the life of the battery. For example, a battery with a 100% capacity may correspond to a new battery capable of charging to the maximum capacity of the battery. As such, the capacity of the battery may degrade over time or with the number of charging cycles completed by the battery, amongst other possibilities.

In some embodiments, the capacity of the battery may decrease with the number of charging cycles completed by the battery. For example, a battery that has completed 1 to 100 charging cycles may have greater than or equal to approximately a 95% capacity of its maximum capacity. Further, a battery that has completed 101 to 300 charging cycles may have approximately an 85% to 95% capacity of its maximum capacity. Yet further, a battery that has completed greater than 300 charging cycles have a less than approximately an 85% capacity of its maximum capacity. In addition, an old battery may have approximately a 15% of its maximum capacity, among other possibilities.

In some embodiments, the capacity of the battery may decrease with time as the battery ages and/or towards the later stages of the battery's life. For example, a battery that has been used for 1 to 6 months may have greater than or equal to approximately a 95% capacity of its maximum capacity. Further, a battery that has been used for 6 to 12 months may have approximately an 85% to 95% capacity of its maximum capacity. Yet further, a battery that has been used for 12 to 24 months may have a less than approximately an 85% capacity of its maximum capacity. In addition, a battery that has been used for over 24 months may have approximately a 15% capacity of its maximum capacity.

In some embodiments, a computing device may determine the capacity of a battery. For example, referring back to FIG. 1A, computing device 100A may include a sensor that measures the discharge current over time. Further, considering one or more scenarios above, computing device 100A may measure the discharge current of a battery. In particular, computing device 100A may measure the discharge current 700 mA in a 1 hour interval of time to determine that the capacity of the battery is 700 mAh. Further, considering another scenario above, computing device 100A may measure the discharge current of 690 mAh in a 1 hour interval of time to determine that the capacity of the battery has is 690 mAh, possibly decreased from the 800 mAh capacity.

In some embodiments, one or more characteristics of the battery may include an impedance of the battery. In some instances, the impedance may increase proportionally with the number of charging cycles completed by the battery. In some instances, the impedance of the battery may be described as a percentage of impedance in the battery. For example, a battery with approximately a 100% impedance may correspond to a new battery. In some instances, a battery that has completed 1 to 100 charging cycles may have approximately a 110% impedance. Further, a battery that has completed 101 to 300 charging cycles may have approximately a 110% to 150% impedance. Yet further, a battery that has completed over 300 charging cycles may have approximately a 150% impedance, among other possibilities. In some embodiments, the impedance of the battery may increase with time as the battery ages. For example, a battery that has been used for 1 to 6 months may have approximately a 105% to 125% impedance. Further, a battery that has been used for 6 to 12 months may have approximately a 125% to 150% impedance. Yet further, a battery that has been used for 12 to 24 months may have approximately a 150% to 200% impedance. In addition, a battery that has been used for over 24 months may have over a 200% impedance, among other possibilities.

In some embodiments, a computing device may determine the impedance of a battery. For example, referring back to FIG. 1A, computing device 100A may include a sensor that measures the impedance of the battery. In some embodiments, computing device 100A may determine the impedance of the battery using various other methods. For example, computing device 100A may determine the impedance of the battery by measuring the ohmic resistance, inductive reactance, and/or the capacitive reactance of the battery. In some instances, computing device 100A may measure the potential difference of the battery and a current (e.g., the charge current and/or discharge current) to determine the resistance in the battery. Yet further, an alternating current may be used to excite the battery and Ohm's law may be used to calculate the resistance of the battery. In addition, electromechanical impedance spectroscopy (EIS) methods may be used to determine the impedance of the battery, among other possibilities.

In some instances, the computing device may determine the impedance of the battery by measuring the temperature of the battery. In particular, charging a battery with a high impedance (e.g., 150%) may cause the battery to heat up more than a battery with a lower impedance (e.g., 100%). Thus, when a battery gets hotter than usual during charging, this temperature may be measured as an indication of a higher impedance of the battery. In particular, the current flowing to the battery may be dissipated as heat. In some instances, the heat dissipation may also be an indication that the efficiency of the battery may be diminishing. Further, if the current is being wasted away through heat dissipation, then the cycle life of the battery may further diminish, possibly at an accelerated rate.

In some embodiments, the state of the battery may include the battery's state of charge (SOC). In some instances, a computing device may determine, for example, the SOC of the battery as described above in relation to FIG. 3. For example, the computing device may determine that the battery has a 50% SOC, an 80% SOC, and a 100% SOC, among other possibilities. In some embodiments, the state of the battery may be indicative of the physical state of the battery. For example, computing device 100A may determine that the battery is connected to a power source for recharging the battery.

In some embodiments, the state of the battery may be indicative of other characteristics of the battery. For example, the characteristic of the battery may include a temperature of the battery, an ambient temperature in an environment of the battery, and/or a temperature of a system or computing device powered by the battery. Further, in some instances, the characteristic of the battery may include approaching, meeting, and/or exceeding a temperature threshold. For example, a battery may be approaching a lower or an upper temperature threshold. Further, the battery may meet or exceed the lower or upper temperature threshold, among other possibilities.

It should be noted that computing device 100A may connect to a battery and determine, for example, the state of the battery. Further, in some instances, server 100B may determine, for example, the state of the battery. Yet further, in some instances, computing device 100A and server 100B, in combination, may determine the state of the battery. In particular, computing device 100A may connect to the battery and retrieve information indicative of the state of the battery. Further, computing device 100A may send the information to server 100B and server 100B may determine the state of the battery.

In some embodiments, the state of an electric vehicle battery may be determined. For example, the state of the electric vehicle battery may correspond to the type of an electric vehicle battery, possibly based on the manufacturer of the electric vehicle battery. In some instances, the state of a battery manufactured by TESLA may vary from a battery manufactured by NISSAN LEAF, CHEVROLET VOLT, and/or other possible manufacturers of electric vehicles or electric vehicle batteries. Yet further, the state of the electric vehicle battery may correspond to the capacity, e.g., 56 to 65 kWh, and/or the delivery of electric power, e.g., 215 kW to 250 kW. In addition, the state of the electric vehicle battery may correspond to various characteristics such as cell type (e.g., Lithium-ion cells and/or Nickel Metal Hydride), cooling mechanisms (e.g., liquid-cooling mechanisms), and/or architecture for wiring the battery cells.

C. Determining a Pulse Time and a Rest Time of a Current for Charging the Battery to the Target SOC The method 200 continues at block 206. Based at least on the state of the battery, method 200 includes the computing device determining a pulse time and a rest time of a current for charging the battery to the target SOC. For example, based on the battery being charged by the computing device, the computing device may determine a pulse time and a rest time of a current for charging the battery to the target SOC. In some instances, based on receiving an indication of a target SOC, the computing device may determine a pulse time and a rest time of a current for charging the battery to the target SOC. Further, based on any one of an impedance of the battery, a capacity of the battery, a number of cycles completed by the battery, and/or a temperature associated with the battery, the computing device may determine a pulse time and a rest time of a current for charging the battery to the target SOC.

Figure 4:
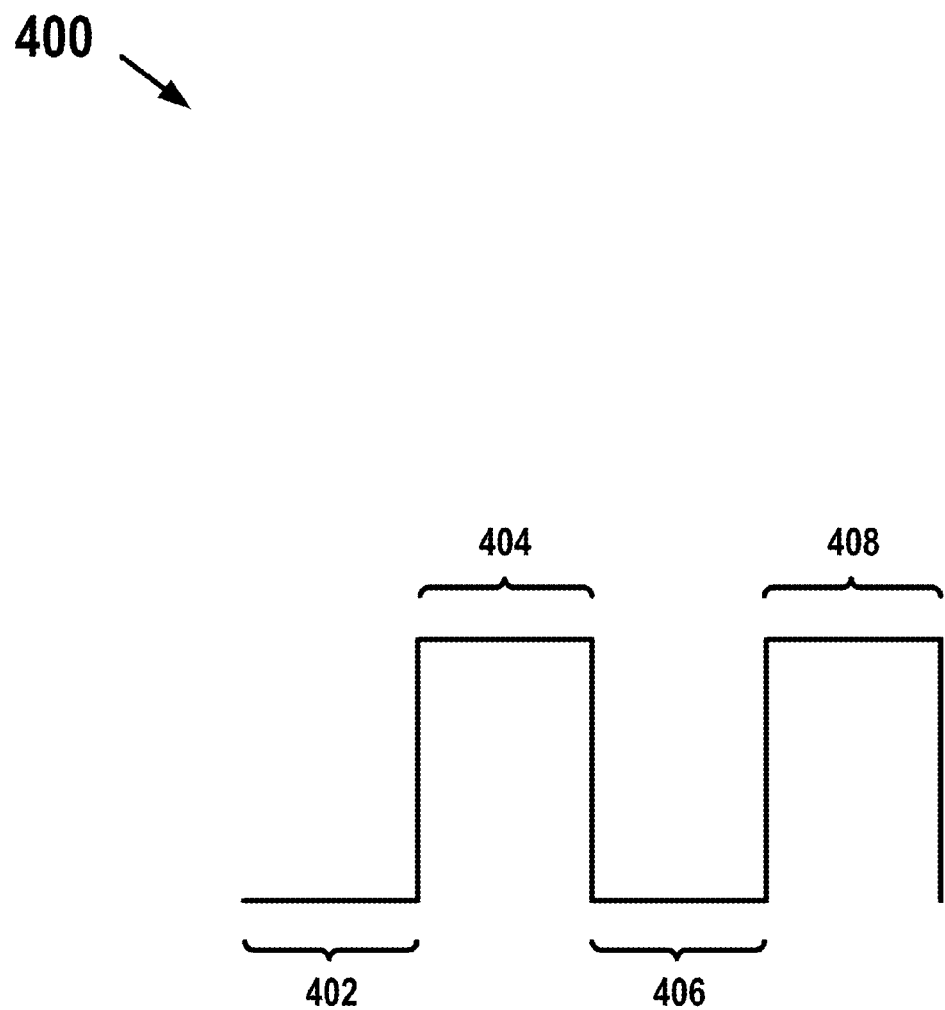
FIG. 4 illustrates an example current for charging a battery, in accordance with some embodiments.

FIG. 4 illustrates an example current for charging a battery, in accordance with some embodiments. As shown, pulsed current 400 may be used to charge a battery. Pulsed current 400 may be determined to charge a battery, for example, by computing device 100A described above in relation to FIG. 1A and/or server 100B described above in relation to FIG. 1B. In some embodiments, computing device 100A and/or server 100B may determine rest times 402 and 406 when pulsed current 400 is low. Further, computing device 100A and/or server 100B may determine pulse times 404 and 408 when pulsed current 400 is high. In some embodiments, computing device 100A and/or server 100B may determine rest times 402 and 406 to range from 1 to 60 seconds, among other time ranges. Further, computing device 100A and/or server 100B may determine pulse times 404 and 408 to range from 1 to 60 seconds, among other time ranges. Yet further, in some instances, pulse times 404 and 408 may be longer (e.g., 60 seconds) than rest times 402 and 406 (e.g., 20 seconds), among other possibilities.

FIG. 5A illustrates example conditions for charging a battery, in accordance with some embodiments. In scenario 500, a computing device may determine a pulse time and a rest time of a current for charging a battery to a target SOC, for example, in any manner described above in relation to FIGS. 1 through 4. For example, based on conditions 1 through 7, computing device 100A from FIG. 1A and/or server 100B from FIG. 1B may determine a pulse time and a rest time of a current for charging a battery to the target SOC. Further, the conditions 1 through 7 may provide pulse times 404 and 408, and rest times 402 and 406 of pulsed current 400 illustrated in FIG. 4. Yet further, the conditions 1 through 7 may be used to charge battery 302 to a 50% SOC, and 80% SOC, and/or a 100% SOC as shown in FIG. 3, among other possible SOCs.

As shown in FIG. 5A, each of the conditions 1 through 7 corresponds to a current for possibly charging a battery to a target SOC. Further, each current corresponds to a C rate, a pulse time, a rest time, and an average current. Yet further, the charge time corresponds to the time it takes in minutes to charge the battery to a 50% SOC, an 80% SOC, and a 100% SOC. As such, a computing device may use conditions 1 through 7 for determining a pulse time and a rest time of a current for charging the battery to a target SOC. For example, computing device 100A may store conditions 1 through 7 as data records in data storage 104 in FIG. 1A. Further, server 100B may store conditions 1 through 7 as data records in data storage 124 in FIG. 1B.

As shown in FIG. 5A, a current corresponding to condition 1 may be determined to charge a battery to a target SOC. In particular, a current with a 2C rate may be determined to charge the battery to a target SOC. Further, a pulse time of 60 seconds and a rest time of 20 seconds may be determined for an average 1.5C rate. Yet further, the current may be determined to charge the battery to a 50% SOC in 20.1 minutes, an 80% SOC in 32.8 minutes, and a 100% SOC in 80.6 minutes.

In some embodiments, a current corresponding to condition 2 may be determined to charge a battery to a target SOC. In particular, a current with a 1.5C rate may be determined to charge the battery to a target SOC. Further, a constant current with a full pulse time and no rest time may be determined, such that the current is continuously high for an average 1.5C rate. Yet further, the current may be determined to charge the battery to a 50% SOC in 20.3 minutes, an 80% SOC in 34.5 minutes, and a 100% SOC in 88.9 minutes.

In some embodiments, a current corresponding to condition 3 may be determined to charge a battery to a target SOC. In particular, a current with a 1.5C rate may be determined to charge the battery to a target SOC. Further, a pulse time of 60 seconds and a rest time of 10 seconds may be determined for an average 1.29C rate. Yet further, the current may be determined to charge the battery to a 50% SOC in 23.7 minutes, an 80% SOC in 38.4 minutes, and a 100% SOC in 91.0 minutes.

In some embodiments, a current corresponding to condition 4 may be determined to charge a battery to a target SOC. In particular, a current with a 1.5C rate may be determined to charge the battery to a target SOC. Further, a pulse time of 60 seconds and a rest time of 30 seconds may be determined for an average 1C rate. Yet further, the current may be determined to charge the battery to a 50% SOC in 29.4 minutes, an 80% SOC in 46.6 minutes, and a 100% SOC in 92.8 minutes.

In some embodiments, a current corresponding to condition 5 may be determined to charge a battery to a target SOC. In particular, a current with a 1.5C rate may be determined to charge a battery to a target SOC. Further, a pulse time of 60 seconds and a rest time of 60 seconds may be determined for an average 0.75C rate. Yet further, the current may be determined to charge the battery to a 50% SOC in 40.4 minutes, an 80% SOC in 61.0 minutes, and a 100% SOC in 110.3 minutes.

In some embodiments, a current corresponding to condition 6 may be determined to charge a battery to a target SOC. In particular, a current with a 0.7C rate may be determined to charge a battery to a target SOC. Further, a constant current with a full pulse time and no rest time may be determined, such that the current is continuously high for an average 0.7C rate. Yet further, the current may be determined to charge the battery to a 50% SOC in 44.2 minutes, an 80% SOC in 70.7 minutes, and a 100% SOC in 138.0 minutes.

In some embodiments, a constant current and a constant voltage corresponding to condition 7 may be determined to charge a battery to a target SOC. As noted, a constant-current and constant-voltage (CC-CV) charging method may be used to charge a battery. Further, in some embodiments, a multi-step CC-CV charging method may be used to charge a battery. In some instances, a multi-step CC-CV charging method involves a number of currents paired with a number of voltages to charge the battery.

In some embodiments, four pairs of constant currents and constant voltages may be determined to charge a battery to a target SOC. In particular, a battery may be charged by a first pair including a current with a 1C rate and a voltage of 4.1V. Further, the battery may be charged with a second pair including a current with a 0.7C rate and a voltage of 4.15V. Yet further, the battery may be charged with a third pair including a current with a 0.5C rate and a voltage of 4.52V. In addition, the battery may be charged with a fourth pair including a current with a 0.3C rate and a voltage of 4.35V. In some instances, one or more of the four pairs of currents and voltages may be used to charge the battery.

In some embodiments, a condition may be selected from conditions 1 through 7 to charge a battery to a target SOC. As such, a pulse time and a rest time corresponding to the selected condition may be determined to charge the battery to the target SOC.

In some embodiments, a condition may be selected from conditions 1 through 7 based on a target SOC. For example, a target SOC may be a 50% SOC. In some instances, based on the 50% target SOC, either one of conditions 1 and 2 may be selected to charge the battery to the target SOC, possibly to reach the target SOC in approximately 20 minutes. Yet, in some instances, condition 4 may be selected to charge the battery to the target SOC, possibly to reach the target SOC in approximately 30 minutes. In some embodiments, a user of a computing device may enter a target SOC into a graphical user interface (GUI) of the computing device and the condition to charge a battery may be determined.

In some embodiments, a condition may be selected from conditions 1 through 7 based on the state of the battery. In some instances, based on the state of the battery, charging the battery faster may adversely impact the performance of the battery, accelerate battery cell aging, and/or decrease the cycle life of the battery. Thus, in some instances, the battery may be charged slower in an effort to sustain the performance, slow cell aging, and/or preserve the cycle life of the battery. For example, as noted, using conditions 1 and 2 may take approximately 20 minutes to charge a battery to a 50% SOC. Yet, using condition 4 may take approximately 30 minutes to charge the battery to the 50% SOC. In some instances, condition 4 may be selected instead of conditions 1 and 2 based on the state of the battery, possibly to sustain the performance, slow cell aging, and/or preserve the cycle life of the battery.

In some embodiments, a condition may be selected from conditions 1 through 7 based on time available for charging the battery to the target SOC. For example, considering the scenario above, conditions 1 and 2 may be selected based on an available time of approximately 20 minutes to charge a battery. In some instances, a user may input into a GUI of the computing device that the available time to charge the battery is limited to 20 minutes. As such, the computing device may select conditions 1 or 2 to charge the battery. Yet, considering a scenario such that the user inputs into the computing device that the available time to charge the battery is limited to 30 minutes, the computing device may select condition 4 to charge the battery.

Figure 5B:
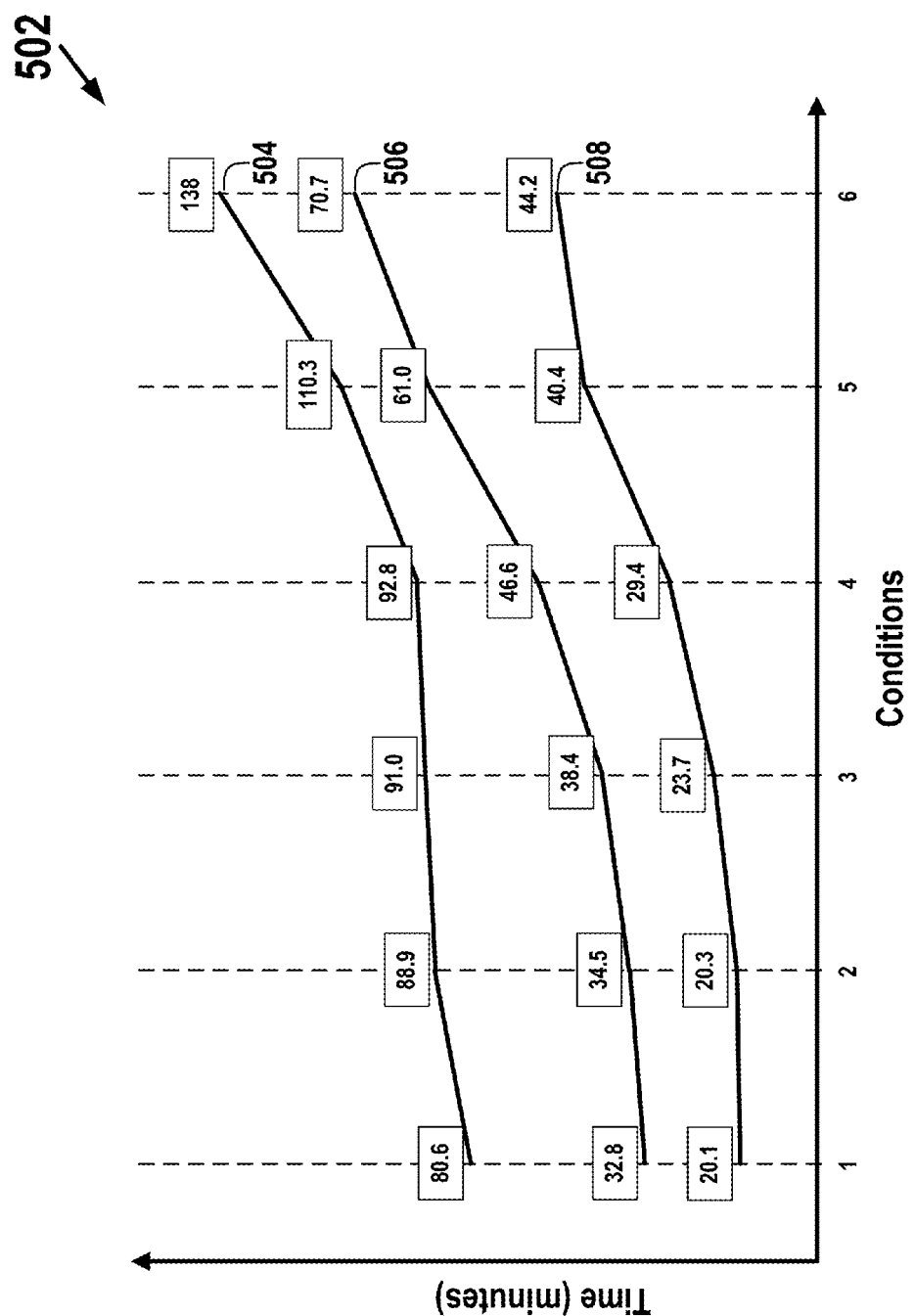
FIG. 5B illustrates example times for charging a battery, in accordance with some embodiments.

FIG. 5B illustrates example times for charging a battery, in accordance with some embodiments. As shown in FIG. 5B, the times for charging the battery may correspond to the times provided in FIG. 5A. The times for charging the battery in scenario 502 may be determined, for example, in any manner described above in relation to FIG. 1A through 5A. For example, computing device 100A from FIG. 1A and/or server 100B from FIG. 1B may determine the time it takes to charge a battery to a target SOC. Further, based on the time it takes to charge the battery, computing device 100A and/or server 100B may determine a pulse time and a rest time of a current for charging the battery to the target SOC.

As shown in FIG. 5B, the y-axis provides time in minutes and the x-axis provides the conditions 1 through 6 as described in relation to FIG. 5A. Further, line 504 corresponds to times to charge a battery to a 100% SOC, line 506 corresponds to times to charge a battery to an 80% SOC, and line 508 corresponds to times to charge a battery to a 50% SOC. In particular, charging a battery using condition 1 takes 20.1 minutes to charge the battery to a 50% SOC, 32.8 minutes to charge the battery to an 80% SOC, and 80.6 minutes to charge the battery to a 100% SOC.

Further, charging a battery using condition 2 takes 20.3 minutes to charge to the battery a 50% SOC, 34.5 minutes to charge the battery to an 80% SOC, and 88.9 minutes to charge the battery to a 100% SOC. Yet further, charging a battery using condition 3 takes 23.7 minutes to charge the battery to a 50% SOC, 38.4 minutes to charge the battery to an 80% SOC, and 91.0 minutes to charge the battery to a 100% SOC. In addition, charging a battery using condition 4 takes 29.4 minutes to charge the battery to a 50% SOC, 46.6 minutes to charge the battery to an 80% SOC, and 92.8 minutes to charge the battery to a 100% SOC. Further, charging a battery using condition 5 takes 40.4 minutes to charge the battery to a 50% SOC, 61.0 minutes to charge to an 80% SOC, and 110.3 minutes to charge the battery to a 100% SOC. Yet further, charging a battery using condition 6 takes 44.2 minutes to charge the battery to a 50% SOC, 70.7 minutes to charge the battery to an 80% SOC, and 138 minutes to charge the battery to a 100% SOC.

In some embodiments, the battery may be charged using one condition to a given SOC and further, the battery may also be charged using a different condition to a higher SOC. For example, a battery may be charged using condition 1 until the SOC reaches a 50% SOC in approximately 20.1 minutes. Further, the battery may be charged using condition 5 until the battery reaches an 80% SOC in approximately 20.6 minutes. Yet further, the battery may also be charged using condition 6 until the battery reaches a 100% SOC in approximately 67.3 minutes, among other possibilities. In some instances, the battery may be charged using a variety of the conditions 1 through 7 to sustain the performance, slow cell aging, and/or preserve the cycle life of the battery.

Figure 6A:
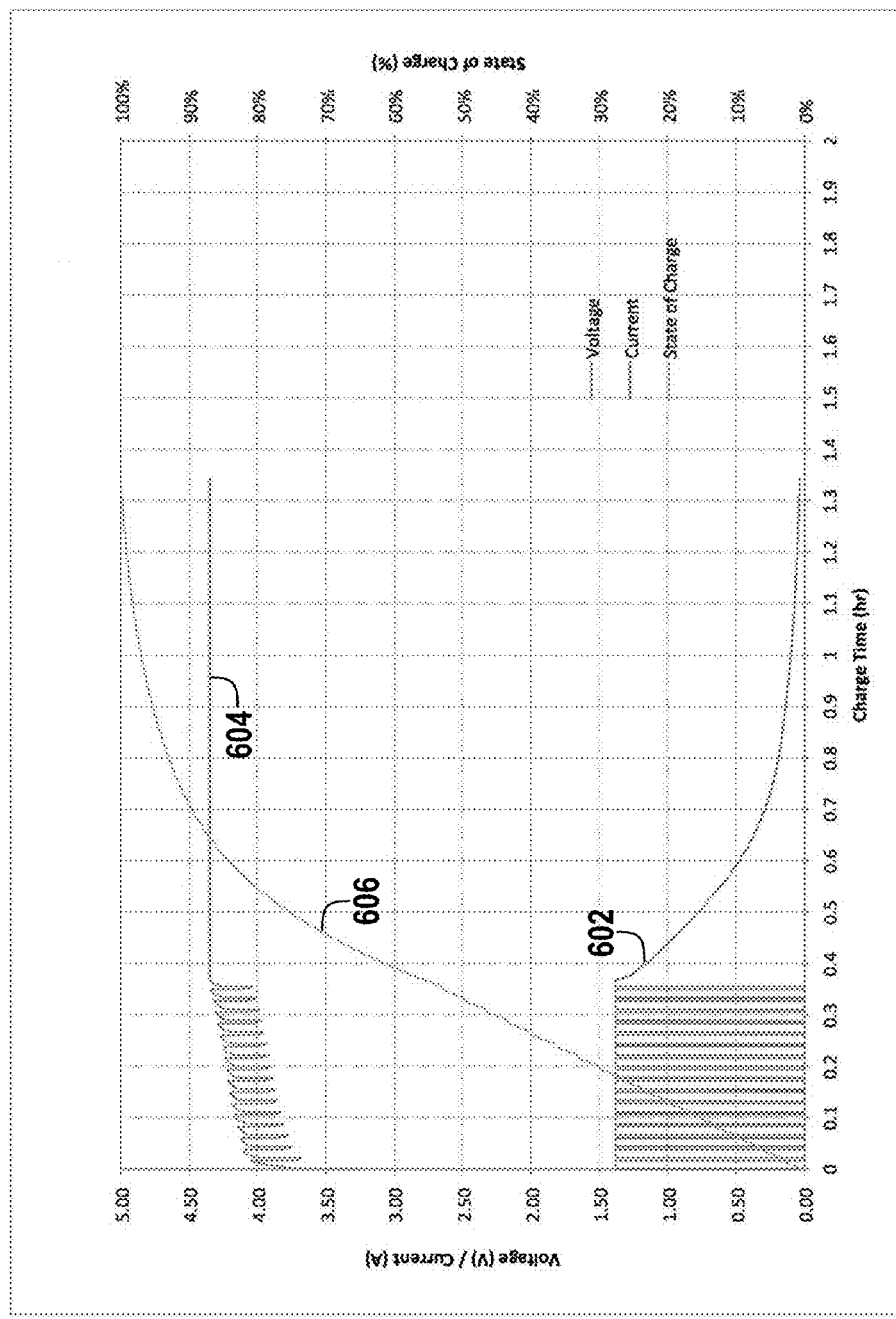
FIG. 6A illustrates an example condition 1 for charging a battery, in accordance with some embodiments.

FIG. 6A illustrates an example condition 1 for charging a battery, in accordance with some embodiments. As shown in FIG. 6A, condition 1 for charging a battery with a 690 mAh capacity may correspond to condition 1 as described in relation to FIGS. 5A and 5B. Further, the pulse time and the rest time of current 602 for charging the battery may be determined, for example, in any manner described above in relation to FIGS. 1 through 5B. For example, computing device 100A and/or server 100B may determine the state of a battery. Further, based on the state of the battery, computing device 100A and/or server 100B may determine the pulse time and the rest time of current 602 for charging the battery to the target SOC.

As shown in FIG. 6A, the left y-axis provides voltage in volts and current in amperes on the left side, and the right y-axis provides the percentage SOC of the battery. Further, the x-axis provides charge time in hours. Yet further, current 602 provides the pulsed current with a pulse time of 60 seconds and a rest time of 20 seconds for charging the battery over the charge time. In addition, voltage 604 provides the voltage for charging the battery over the charge time. Further, SOC 606 provides the SOC of the battery over the charge time.

Figure 6B:
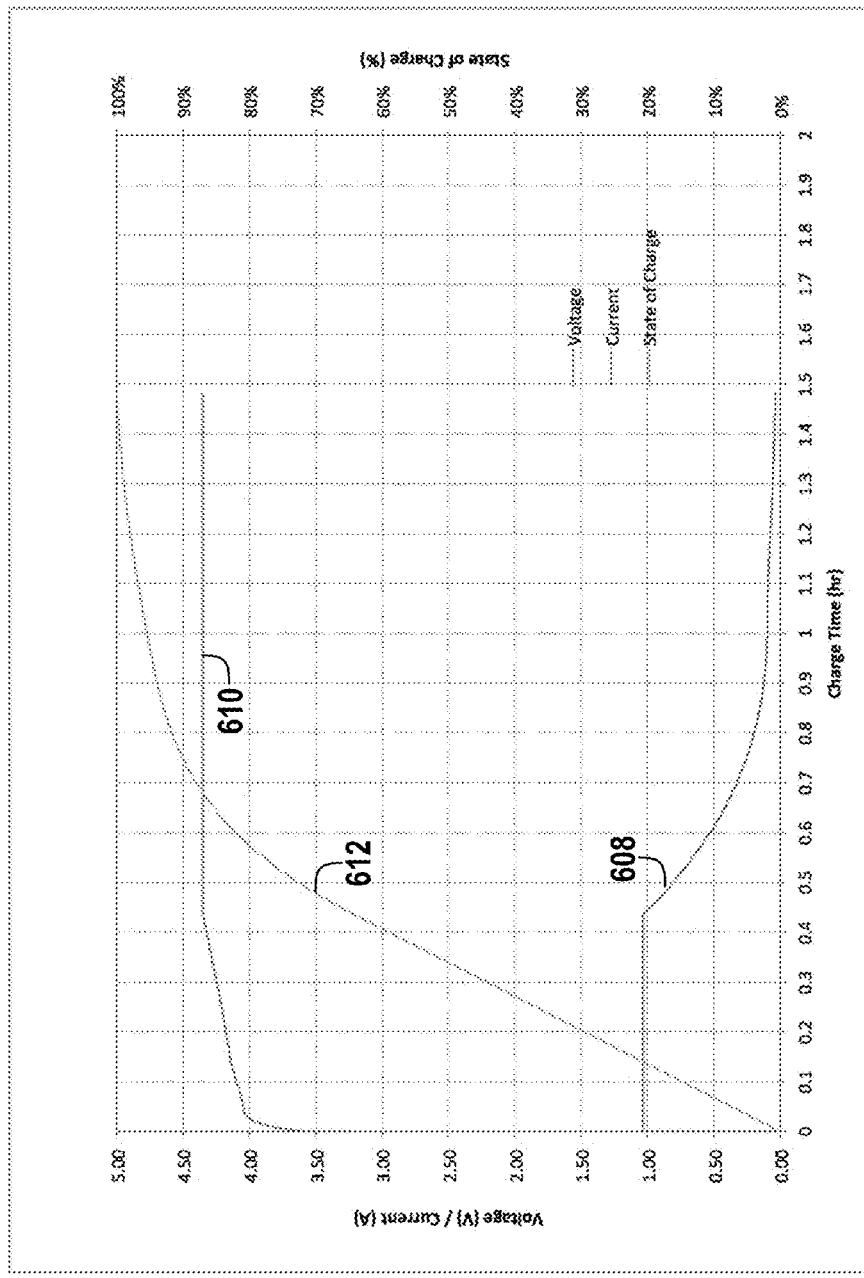
FIG. 6B illustrates an example condition 2 for charging a battery, in accordance with some embodiments.

FIG. 6B illustrates an example condition 2 for charging a battery, in accordance with some embodiments. As shown in FIG. 6B, condition 2 for charging a battery with a 690 mAh capacity may correspond to condition 2 as described in relation to FIGS. 5A and 5B. Further, the pulse time and the rest time of current 608 for charging the battery may be determined, for example, in any manner described above in relation to FIGS. 1 through 5B. For example, computing device 100A and/or server 100B may determine the state of a battery. Further, based on the state of the battery, computing device 100A and/or server 100B may determine the pulse time and the rest time of current 608 for charging the battery to the target SOC.

As shown in FIG. 6B, the left y-axis provides voltage in volts and current in amperes on the left side, and the right y-axis provides the percentage SOC of the battery. Further, the x-axis provides charge time in hours. Yet further, current 608 provides a constant current with a full pulse time and no rest time, such that the current is continuously high. In addition, voltage 610 provides the voltage for charging the battery over the charge time. Further, SOC 612 provides the SOC of the battery over the charge time.

Figure 6C:
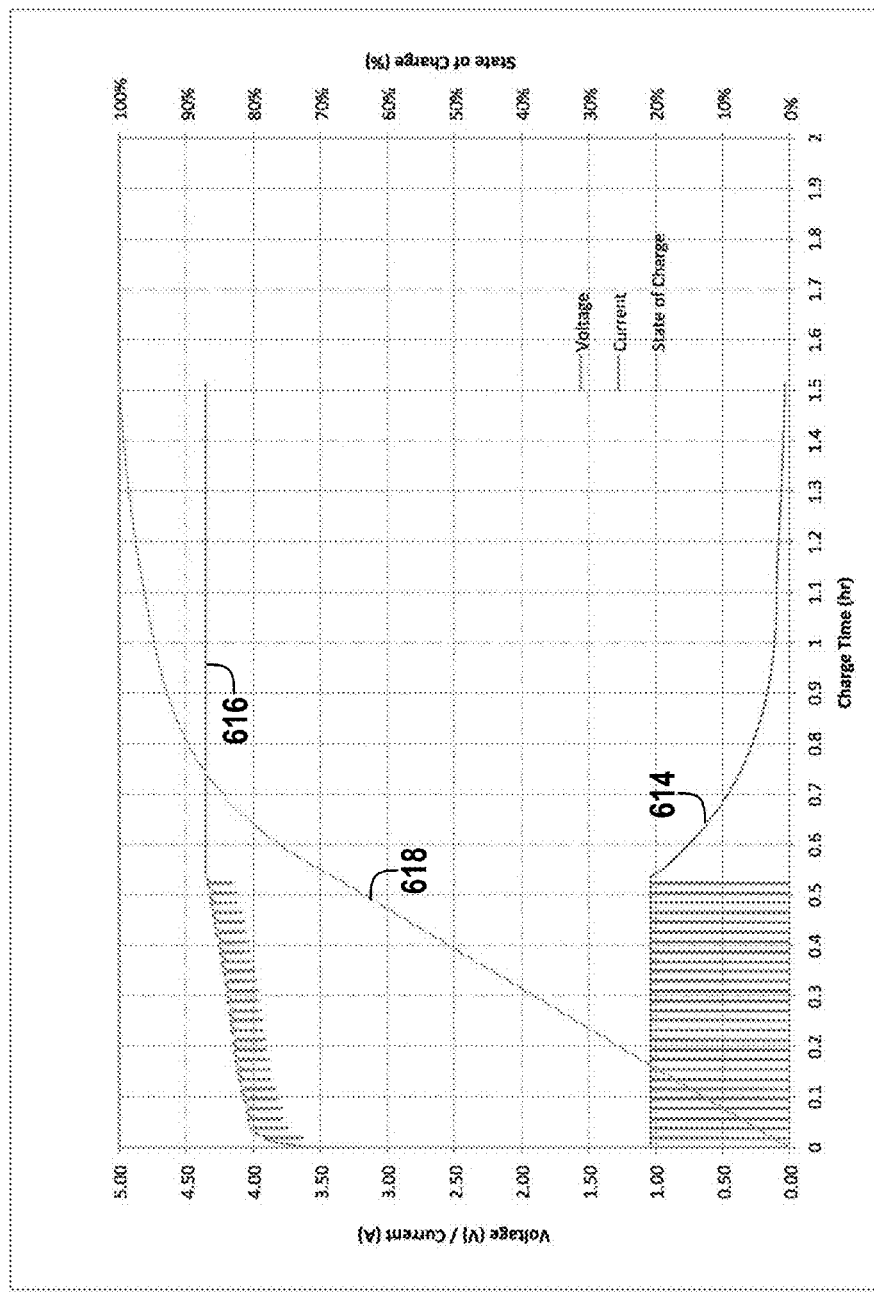
FIG. 6C illustrates an example condition 3 for charging a battery, in accordance with some embodiments.

FIG. 6C illustrates an example condition 3 for charging a battery, in accordance with some embodiments. As shown in FIG. 6C, condition 3 for charging a battery with a 690 mAh capacity may correspond to condition 3 as described in relation to FIGS. 5A and 5B. Further, the pulse time and the rest time of current 614 for charging the battery may be determined, for example, in any manner described above in relation to FIGS. 1 through 5B. For example, computing device 100A and/or server 100B may determine the state of a battery. Further, based on the state of the battery, computing device 100A and/or server 100B may determine the pulse time and the rest time of current 614 for charging the battery to the target SOC.

As shown in FIG. 6C, the left y-axis provides voltage in volts and current in amperes on the left side, and the right y-axis provides the percentage SOC of the battery. Further, the x-axis provides charge time in hours. Yet further, current 614 provides the pulsed current with a pulse time of 60 seconds and a rest time of 10 seconds for charging the battery over the charge time. In addition, voltage 616 provides the voltage for charging the battery over the charge time. Further, SOC 614 provides the SOC of the battery over the charge time.

Figure 6D:
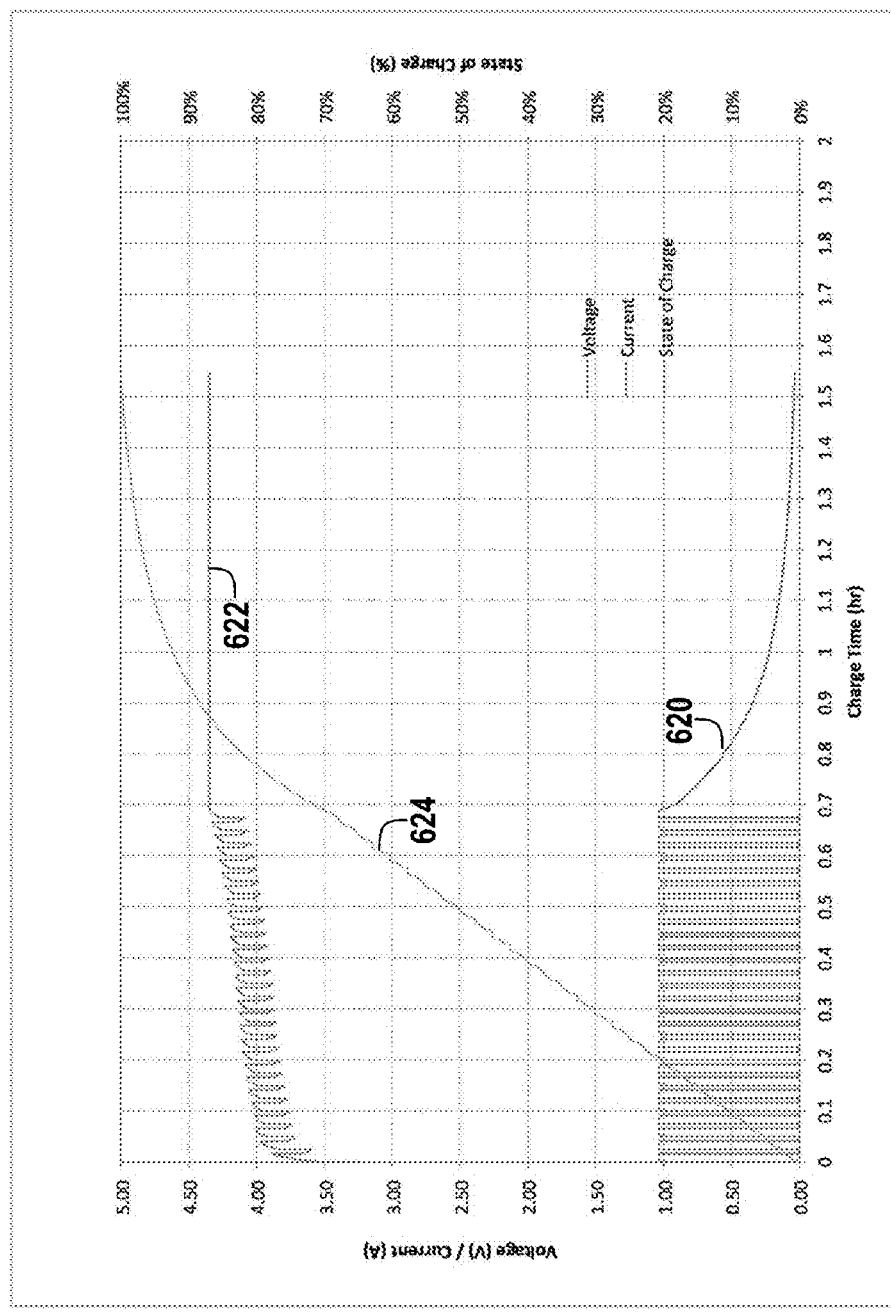
FIG. 6D illustrates an example condition 4 for charging a battery, in accordance with some embodiments.

FIG. 6D illustrates an example condition 4 for charging a battery, in accordance with some embodiments. As shown in FIG. 6D, condition 4 for charging a battery with a 690 mAh capacity may correspond to condition 4 as described in relation to FIGS. 5A and 5B. Further, the pulse time and the rest time of current 620 for charging the battery may be determined, for example, in any manner described above in relation to FIGS. 1 through 5B. For example, computing device 100A and/or server 100B may determine the state of a battery. Further, based on the state of the battery, computing device 100A and/or server 100B may determine the pulse time and the rest time of current 614 for charging the battery to the target SOC.

As shown in FIG. 6D, the left y-axis provides voltage in volts and current in amperes on the left side, and the right y-axis provides the percentage SOC of the battery. Further, the x-axis provides charge time in hours. Yet further, current 620 provides the pulsed current with a pulse time of 60 seconds and a rest time of 30 seconds for charging the battery over the charge time. In addition, voltage 622 provides the voltage for charging the battery over the charge time. Further, SOC 624 provides the SOC of the battery over the charge time.

Figure 6E:
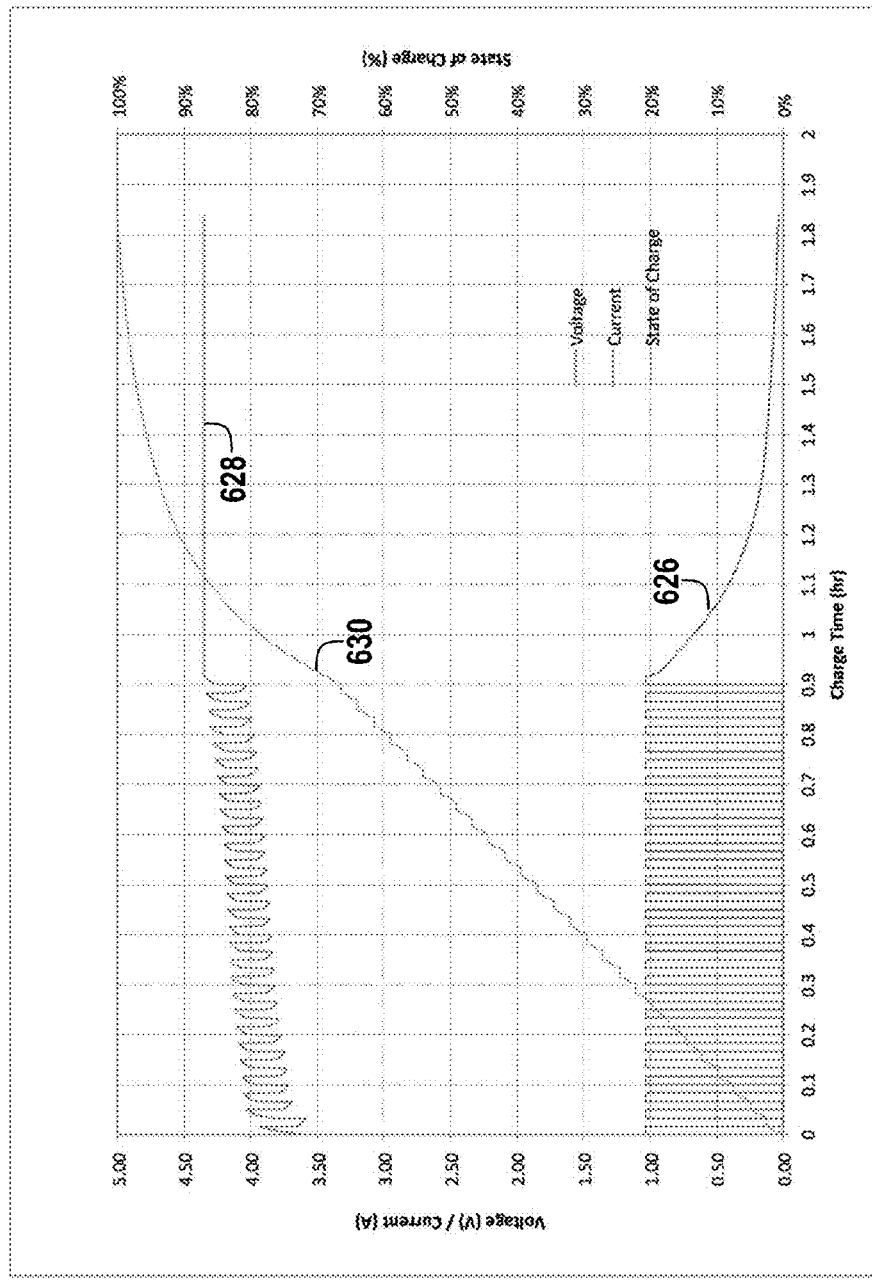
FIG. 6E illustrates an example condition 5 for charging a battery, in accordance with some embodiments.

FIG. 6E illustrates an example condition 5 for charging a battery, in accordance with some embodiments. As shown in FIG. 6E, condition 5 for charging a battery with a 690 mAh capacity may correspond to condition 5 as described in relation to FIGS. 5A and 5B. Further, the pulse time and the rest time of current 626 for charging the battery may be determined, for example, in any manner described above in relation to FIGS. 1 through 5B. For example, computing device 100A and/or server 100B may determine the state of a battery. Further, based on the state of the battery, computing device 100A and/or server 100B may determine the pulse time and the rest time of current 630 for charging the battery to the target SOC.

As shown in FIG. 6E, the left y-axis provides voltage in volts and current in amperes on the left side, and the right y-axis provides the percentage SOC of the battery. Further, the x-axis provides charge time in hours. Yet further, current 626 provides the pulsed current with a pulse time of 60 seconds and a rest time of 60 seconds for charging the battery over the charge time. In addition, voltage 628 provides the voltage for charging the battery over the charge time. Further, SOC 630 provides the SOC of the battery over the charge time.

FIG. 7 illustrates example conditions for charging a battery based on characteristics of the battery, in accordance with some embodiments. The conditions in scenario 700 may be used to charge a battery, for example, in any manner described above in relation to FIGS. 1 through 6. For instance, computing device 100A may determine characteristics of a battery as shown in scenario 700, for example, in any manner described above for block 204 of method 200. Further, information regarding the characteristics of the battery may be sent through network interface 110 and server 100B may receive the information through network interface 130, among other possibilities. As such, the characteristics of the battery may be determined, for example, by server 100B as described above in relation to FIG. 1B. Further, the conditions in scenario 700 may illustrate aspects of current 400 with pulse times 404 and 408, and rest times 402 and 406 illustrated in FIG. 4. Yet further, the conditions in scenario 700 may be used to charge battery 302 to a 50% SOC, and 80% SOC, and/or a 100% SOC as shown in FIG. 3, among other possible SOCs.

As shown in FIG. 7, conditions 1 through 27 are provided for charging a battery. Each of these conditions corresponds to characteristics of a battery and a pulse current to charge the battery. Further, the characteristics of the battery correspond to a number of cycles completed by the battery, a capacity of the battery, and an impedance of the battery. Yet further, each pulsed current may correspond to a respective pulse time and rest time. As such, a computing device may determine characteristics of the battery. Further, based on these characteristics, the computing device may use these conditions for determining a pulse time and a rest time of a current for charging the battery to a target SOC.

As shown in FIG. 7, a battery may be determined to have characteristics described by condition 1. In particular, the battery may have completed 0 to 100 charging cycles, the battery may have a capacity greater than or equal to 95%, and the battery may have an impedance less than or equal to 110%. Based on determining such characteristics of the battery, the battery may be charged using a pulsed current with a 2.0C rate, a pulse time of 60 seconds, and a rest time of 20 seconds. In some instances, condition 1 of FIG. 7 may correspond to condition 1 of FIG. 5A. As such, the battery may be charged to a target SOC in a given time, such as a 50% SOC in 20.1 minutes, an 80% SOC in 32.8 minutes, and/or a 100% SOC in 80.6 minutes.

In some embodiments, a battery may be determined to have characteristics described in condition 2 of scenario 700. In particular, the battery may have completed 0 to 100 charging cycles, the battery may have a capacity greater than or equal to 95%, and the battery may have an impedance less than or equal to 150%. Based on determining such characteristics of the battery, the battery may be charged using a pulsed current with a 1.5C rate, a pulse time of 60 seconds, and a rest time of 10 seconds. In some instances, condition 2 of FIG. 7 may correspond to condition 3 of FIG. 5A. As such, the battery may be charged to a target SOC in a given time, such as a 50% SOC in 23.7 minutes, an 80% SOC in 38.4 minutes, and/or a 100% SOC in 91.0 minutes.

In some embodiments, a battery may be determined to have characteristics described in condition 3 of scenario 700. In particular, the battery may have completed 0 to 100 charging cycles, the battery may have a capacity greater than or equal to 95%, and the battery may have an impedance greater than 150%. Based on determining such characteristics of the battery, the battery may be charged using a pulsed current with a 1.0C rate, a pulse time of 60 seconds, and a rest time of 10 seconds. In some instances, this pulsed current may charge a battery with characteristics described in condition 3 to a target SOC.

In some embodiments, a battery may be determined to have characteristics described in condition 4 of scenario 700. In particular, the battery may have completed 0 to 100 charging cycles, the battery may have a capacity greater than or equal to 85%, and the battery may have an impedance less than or equal to 110%. Based on determining such characteristics of the battery, the battery may be charged using a pulsed current with a 1.5C rate, a pulse time of 60 seconds, and a rest time of 10 seconds. In some instances, condition 4 of FIG. 7 may correspond to condition 3 of FIG. 5A. As such, the battery may be charged to a target SOC in a given time, such as a 50% SOC in 23.7 minutes, an 80% SOC in 38.4 minutes, and/or a 100% SOC in 91.0 minutes.

In some embodiments, a battery may be determined to have characteristics described in condition 5 of scenario 700.

In particular, the battery may have completed 0 to 100 charging cycles, the battery may have a capacity greater than or equal to 85%, and the battery may have an impedance less than or equal to 150%. Based on determining such characteristics of the battery, the battery may be charged using a pulsed current with a 1.5C rate, a pulse time of 60 seconds, and a rest time of 30 seconds. In some instances, condition 5 of FIG. 7 may correspond to condition 4 of FIG. 5A. As such, the battery may be charged to a target SOC in a given time, such as a 50% SOC in 29.4 minutes, an 80% SOC in 46.6 minutes, and/or a 100% SOC in 92.8 minutes.

In some embodiments, a battery may be determined to have characteristics described in condition 6 of scenario 700. In particular, the battery may have completed 0 to 100 charging cycles, the battery may have a capacity greater than or equal to 85%, and the battery may have an impedance greater than 150%. Based on determining such characteristics of the battery, the battery may be charged using a pulsed current with a 1.0C rate, a pulse time of 60 seconds, and a rest time of 30 seconds. In some instances, this pulsed current may charge a battery with characteristics described in condition 6 to a target SOC.

In some embodiments, a battery may be determined to have characteristics described in condition 7 of scenario 700. In particular, the battery may have completed 0 to 100 charging cycles, the battery may have a capacity less than 85%, and the battery may have an impedance less than or equal to 110%. Based on determining such characteristics of the battery, the battery may be charged using a pulsed current with a 1.0C rate, a pulse time of 60 seconds, and a rest time of 10 seconds. In some instances, this pulsed current may charge a battery with characteristics described in condition 7 to a target SOC.

In some embodiments, a battery may be determined to have characteristics described in condition 8 of scenario 700. In particular, the battery may have completed 0 to 100 charging cycles, the battery may have a capacity less than 85%, and the battery may have an impedance less than or equal to 150%. Based on determining such characteristics of the battery, the battery may be charged using a pulsed current with a 1.0C rate, a pulse time of 60 seconds, and a rest time of 30 seconds. In some instances, this pulsed current may charge a battery with characteristics described in condition 8 to a target SOC.

In some embodiments, a battery may be determined to have characteristics described in condition 9 of scenario 700. In particular, the battery may have completed 0 to 100 charging cycles, the battery may have a capacity less than 85%, and the battery may have an impedance greater than 150%. Based on determining such characteristics of the battery, the battery may be charged using a pulsed current with a 0.7C rate, a pulse time of 60 seconds, and a rest time of 60 seconds. In some instances, this pulsed current may charge a battery with characteristics described in condition 9 to a target SOC.

In some embodiments, a battery may be determined to have characteristics described in condition 10 of scenario 700. In particular, the battery may have completed 101 to 300 charging cycles, the battery may have a capacity greater than or equal to 95%, and the battery may have an impedance less than or equal to 110%. Based on determining such characteristics of the battery, the battery may be charged using a pulsed current with a 1.5C rate, a pulse time of 60 seconds, and a rest time of 20 seconds. In some instances, this pulsed current may charge a battery with characteristics described in condition 10 to a target SOC.

In some embodiments, a battery may be determined to have characteristics described in condition 11 of scenario 700. In particular, the battery may have completed 101 to 300 charging cycles, the battery may have a capacity greater than or equal to 95%, and the battery may have an impedance less than or equal to 150%. Based on determining such characteristics of the battery, the battery may be charged using a pulsed current with a 1.0C rate, a pulse time of 60 seconds, and a rest time of 10 seconds. In some instances, this pulsed current may charge a battery with characteristics described in condition 11 to a target SOC.

In some embodiments, a battery may be determined to have characteristics described in condition 12 of scenario 700. In particular, the battery may have completed 101 to 300 charging cycles, the battery may have a capacity greater than or equal to 95%, and the battery may have an impedance less than 150%. Based on determining such characteristics of the battery, the battery may be charged using a pulsed current with a 0.7C rate, a pulse time of 60 seconds, and a rest time of 10 seconds. In some instances, this pulsed current may charge a battery with characteristics described in condition 12 to a target SOC.

In some embodiments, a battery may be determined to have characteristics described in condition 13 of scenario 700. In particular, the battery may have completed 101 to 300 charging cycles, the battery may have a capacity greater than or equal to 85%, and the battery may have an impedance less than or equal to 110%. Based on determining such characteristics of the battery, the battery may be charged using a pulsed current with a 1.0C rate, a pulse time of 60 seconds, and a rest time of 10 seconds. In some instances, this pulsed current may charge a battery with characteristics described in condition 13 to a target SOC.

In some embodiments, a battery may be determined to have characteristics described in condition 14 of scenario 700. In particular, the battery may have completed 101 to 300 charging cycles, the battery may have a capacity greater than or equal to 85%, and the battery may have an impedance less than or equal to 150%. Based on determining such characteristics of the battery, the battery may be charged using a pulsed current with a 1.0C rate, a pulse time of 60 seconds, and a rest time of 30 seconds. In some instances, this pulsed current may charge a battery with characteristics described in condition 14 to a target.

In some embodiments, a battery may be determined to have characteristics described in condition 15 of scenario 700. In particular, the battery may have completed 101 to 300 charging cycles, the battery may have a capacity greater than or equal to 85%, and the battery may have an impedance greater than 150%. Based on determining such characteristics of the battery, the battery may be charged using a pulsed current with a 0.7C rate, a pulse time of 60 seconds, and a rest time of 30 seconds. In some instances, this pulsed current may charge a battery with characteristics described in condition 15 to a target SOC.

In some embodiments, a battery may be determined to have characteristics described in condition 16 of scenario 700. In particular, the battery may have completed 101 to 300 charging cycles, the battery may have a capacity less than 85%, and the battery may have an impedance less than or equal to 110%. Based on determining such characteristics of the battery, the battery may be charged using a pulsed current with a 0.7C rate, a pulse time of 60 seconds, and a rest time of 10 seconds. In some instances, this pulsed current may charge a battery with characteristics described in condition 16 to a target SOC.

In some embodiments, a battery may be determined to have characteristics described in condition 17 of scenario 700. In particular, the battery may have completed 101 to 300 charging cycles, the battery may have a capacity less than 85%, and the battery may have an impedance less than or equal to 150%. Based on determining such characteristics of the battery, the battery may be charged using a pulsed current with a 0.7C rate, a pulse time of 60 seconds, and a rest time of 30 seconds. In some instances, this pulsed current may charge a battery with characteristics described in condition 17 to a target SOC.

In some embodiments, a battery may be determined to have characteristics described in condition 18 of scenario 700. In particular, the battery may have completed 101 to 300 charging cycles, the battery may have a capacity less than 85%, and the battery may have an impedance greater than 150%. Based on determining such characteristics of the battery, the battery may be charged using a pulsed current with a 0.5C rate, a pulse time of 60 seconds, and a rest time of 60 seconds. In some instances, this pulsed current may charge a battery with characteristics described in condition 18 to a target SOC.

In some embodiments, a battery may be determined to have characteristics described in condition 19 of scenario 700. In particular, the battery may have completed greater than or equal to 301 charging cycles, the battery may have a capacity greater than or equal to 95%, and the battery may have an impedance less than or equal to 110%. Based on determining such characteristics of the battery, the battery may be charged using a pulsed current with a 1.5C rate, a pulse time of 60 seconds, and a rest time of 30 seconds. In some instances, condition 19 of FIG. 7 may correspond to condition 4 of FIG. 5A. As such, the battery may be charged to a target SOC in a given time, such as a 50% SOC in 29.4 minutes, an 80% SOC in 46.6 minutes, and/or a 100% SOC in 92.8 minutes.

In some embodiments, a battery may be determined to have characteristics described in condition 20 of scenario 700. In particular, the battery may have completed greater than or equal to 301 charging cycles, the battery may have a capacity greater than or equal to 95%, and the battery may have an impedance less than or equal to 150%. Based on determining such characteristics of the battery, the battery may be charged using a pulsed current with a 1.0C rate, a pulse time of 60 seconds, and a rest time of 30 seconds. In some instances, this pulsed current may charge a battery with characteristics described in condition 20 to a target SOC.

In some embodiments, a battery may be determined to have characteristics described in condition 21 of scenario 700. In particular, the battery may have completed greater than or equal to 301 charging cycles, the battery may have a capacity greater than or equal to 95%, and the battery may have an impedance less than 150%. Based on determining such characteristics of the battery, the battery may be charged using a pulsed current with a 0.7C rate, a pulse time of 60 seconds, and a rest time of 30 seconds. In some instances, this pulsed current may charge a battery with characteristics described in condition 21 to a target SOC.

In some embodiments, a battery may be determined to have characteristics described in condition 22 of scenario 700. In particular, the battery may have completed greater than or equal to 301 charging cycles, the battery may have a capacity greater than or equal to 85%, and the battery may have an impedance less than or equal to 110%. Based on determining such characteristics of the battery, the battery may be charged using a pulsed current with a 1.0C rate, a pulse time of 60 seconds, and a rest time of 45 seconds. In some instances, this pulsed current may charge a battery with characteristics described in condition 22 to a target SOC.

In some embodiments, a battery may be determined to have characteristics described in condition 23 of scenario 700. In particular, the battery may have completed greater than or equal to 301 charging cycles, the battery may have a capacity greater than or equal to 85%, and the battery may have an impedance less than or equal to 150%. Based on determining such characteristics of the battery, the battery may be charged using a pulsed current with a 1.0C rate, a pulse time of 60 seconds, and a rest time of 60 seconds. In some instances, this pulsed current may charge a battery with characteristics described in condition 23 to a target SOC.

In some embodiments, a battery may be determined to have characteristics described in condition 24 of scenario 700. In particular, the battery may have completed greater than or equal to 301 charging cycles, the battery may have a capacity greater than or equal to 85%, and the battery may have an impedance greater than 150%. Based on determining such characteristics of the battery, the battery may be charged using a pulsed current with a 0.7C rate, a pulse time of 60 seconds, and a rest time of 60 seconds. In some instances, this pulsed current may charge a battery with characteristics described in condition 24 to a target SOC.

In some embodiments, a battery may be determined to have characteristics described in condition 25. In particular, the battery may have completed greater than or equal to 301 charging cycles, the battery may have a capacity less than 85%, and the battery may have an impedance less than or equal to 110%. Based on determining such characteristics of the battery, the battery may be charged using a pulsed current with a 0.5C rate, a pulse time of 60 seconds, and a rest time of 30 seconds. In some instances, this pulsed current may charge a battery with characteristics described in condition 25 to a target SOC.

In some embodiments, a battery may be determined to have characteristics described in condition 26. In particular, the battery may have completed greater than or equal to 301 charging cycles, the battery may have a capacity less than 85%, and the battery may have an impedance less than or equal to 150%. Based on determining such characteristics of the battery, the battery may be charged using a pulsed current with a 0.5C rate, a pulse time of 60 seconds, and a rest time of 45 seconds. In some instances, this pulsed current may charge a battery with characteristics described in condition 26 to a target SOC.

In some embodiments, a battery may be determined to have characteristics described in condition 27. In particular, the battery may have completed greater than or equal to 301 charging cycles, the battery may have a capacity less than 85%, and the battery may have an impedance less than 150%. Based on determining such characteristics of the battery, the battery may be charged using a pulsed current with a 0.5C rate, a pulse time of 60 seconds, and a rest time of 60 seconds. In some instances, this pulsed current may charge a battery with characteristics described in condition 27 to a target SOC within an available time period.

Figure 8A:
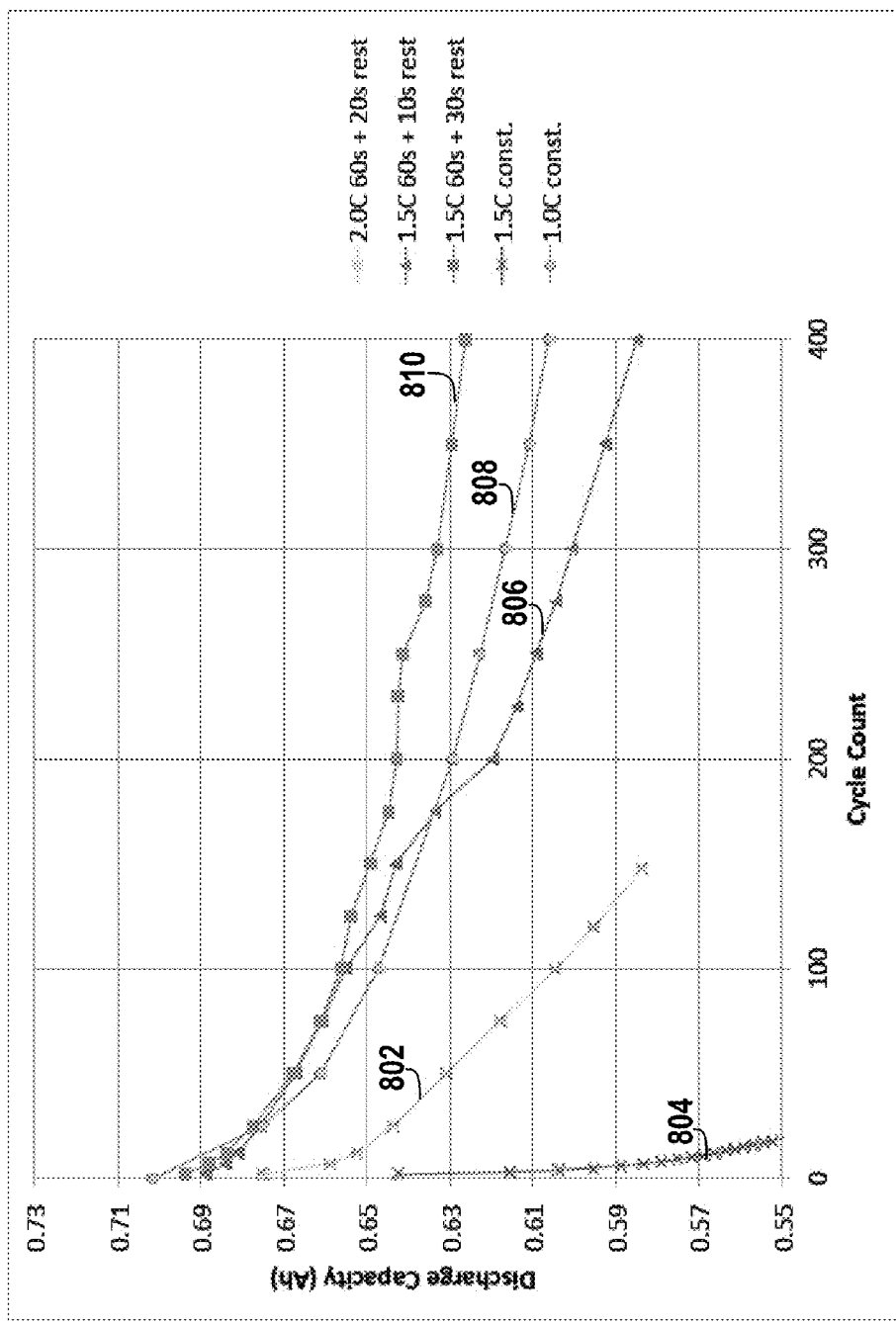
FIG. 8A illustrates an example graph of currents for charging a battery, in accordance with some embodiments.

FIG. 8A illustrates an example graph of currents for charging a battery, in accordance with some embodiments. As shown in FIG. 8A, the currents for charging the battery may correspond to currents provided in FIG. 5A and FIG. 7. The currents in FIG. 8A may be determined, for example, in any manner described above in relation to FIGS. 1 through 7. For instance, computing device 100A and/or server 100B may determine a pulse time and a rest time of one or more of the currents in FIG. 8A to charge the battery to a target SOC. Further, the currents may include pulse times 404 and 408, and rest times 402 and 406 illustrated in FIG. 4. Yet further, the currents in FIG. 8A may be used to charge battery 302 to a 50% SOC, an 80% SOC, and/or a 100% SOC as shown in FIG. 3, among other possible SOCs.

As shown in FIG. 8A, the y-axis provides discharge capacity in Amp-hours (also referred to herein as "capacity" of the battery) and the x-axis provides cycle count, possibly indicative of the cycle life of the battery. Further, lines 802, 804, 806, 808, and 810 may correspond to a number of currents used to charge a battery.

As shown in FIG. 8A, a current may be determined to charge a battery. For example, the current corresponding to line 802 may be a current with a 2.0C rate, a 60 second pulse time, and a 20 second rest time. In some instances, this current may correspond to the current associated with condition 1 of FIG. 5A and/or condition 1 of FIG. 7. As such, the battery may be charged to a target SOC in a given time, such as a 50% SOC in 20.1 minutes, an 80% SOC in 32.8 minutes, and/or a 100% SOC in 80.6 minutes. Yet, as shown in FIG. 8A, charging the battery with the current corresponding to line 802 may adversely impact the cycle life of the battery, possibly causing the battery to last for approximately 100 to 200 cycles. As such, currents corresponding to lines 806 through 810 may be used to charge the battery to sustain the performance of the battery, slow cell aging, and/or preserve the cycle life of the battery.

In some embodiments, the current corresponding to line 804 may be a current with a 1.5C rate and a constant current with a full pulse time and no rest time, such that the current is continuously high. In some instances, this current may correspond to the current associated with condition 2 of FIG. 5A. As such, using this current, a battery may be charged to a target SOC in a given time, such as a 50% SOC in 20.3 minutes, an 80% SOC in 34.5 minutes, and/or a 100% SOC in 88.9 minutes. Yet, as shown in FIG. 8A, charging the battery with the current corresponding to line 802 may adversely impact the cycle life of the battery, possibly causing the battery to last for approximately 20 to 30 cycles. As such, the battery may be charged using currents corresponding to lines 806 through 810 to sustain the performance of the battery, slow cell aging, and/or preserve the cycle life of the battery In some embodiments, the current corresponding to line 806 may be a current with a 1.5C rate, a 60 second pulse time, and a 10 second rest time. In some instances, this current may correspond to the current associated with condition 3 of FIG. 5A, condition 2 of FIG. 7, and/or condition 4 of FIG. 7. As such, using this current, a battery may be charged to a target SOC in a given time, such as a 50% SOC in 23.7 minutes, an 80% SOC in 38.4 minutes, and/or a 100% SOC in 91.0 minutes. As shown in FIG. 8A, charging the battery with the current corresponding to line 806 may preserve the cycle life of the battery for approximately 600 to 700 cycles. As such, the current corresponding to line 806 may be selected to charge the battery to a target SOC.

In some embodiments, the current corresponding to line 808 may be a current with a 1.0C rate with a full pulse time and no rest time, such that the current is continuously high. As noted, charging a battery with a 1C rate may not charge the battery as fast as a 1.5C rate. Yet, as shown in FIG. 8A, charging the battery with the current corresponding to line 808 may preserve the cycle life of the battery for approximately 800 to 1,000 cycles.

In some embodiments, the current corresponding to line 810 may be a current with a 1.5C rate, a 60 second pulse time, and a 30 second rest time. In some instances, this current may correspond to the current in condition 4 of FIG. 5A, condition 5 of FIG. 7, and/or condition 19 of FIG. 7. As such, using this current, a battery may be charged to a target SOC in a given time, such as a 50% SOC in 29.4 minutes, an 80% SOC in 46.6 minutes, and/or a 100% SOC in 92.8 minutes. As shown in FIG. 8A, charging the battery with the current corresponding to line 810 preserve the cycle life of the battery for approximately 1,200 to 1,500 cycles. As such, the current corresponding to line 810 may be selected to charge the battery to a target SOC.

In some embodiments, a battery may be charged with any of the currents corresponding to lines 806 through 810. In some instances, a user may provide an indication to charge the battery using the current corresponding to line 810. In particular, using this current, the battery may be charged to the 50% SOC in 29.4 minutes, which may be approximately 5 to 6 minutes longer than the time it takes to charge the battery using the current corresponding to line 806. As such, the user may be provided with information indicating that charging the battery using the current corresponding to line 810 to the 50% SOC may take approximately 5 to 6 minutes longer. Yet, the user may be provided with additional information indicating that by using the current corresponding to line 810, the cycle life of the battery may be preserved for approximately 100 to 300 more cycles. As such, the user may select the current corresponding to line 810.

Figure 8B:
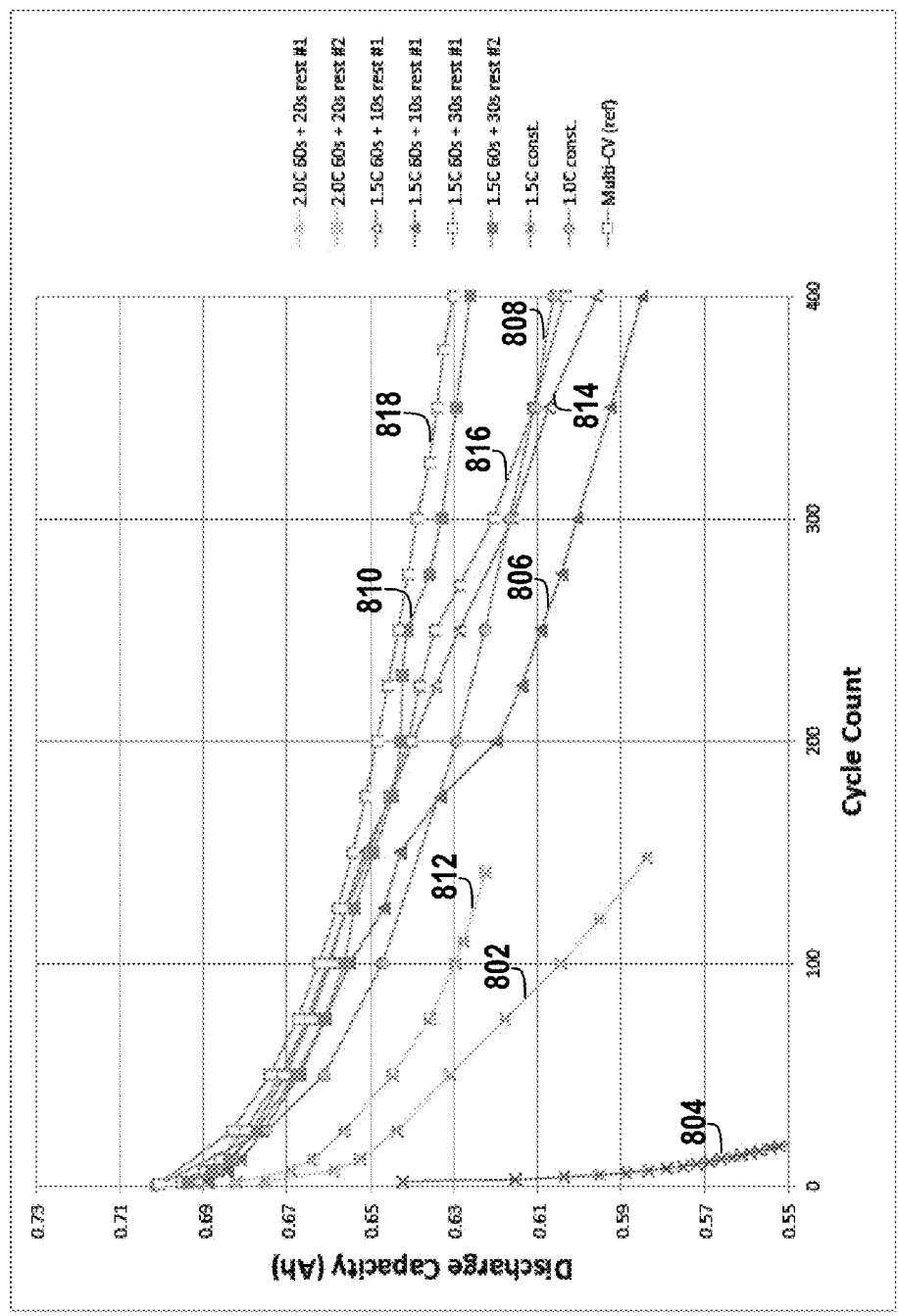
FIG. 8B illustrates another graph of currents for charging a battery, in accordance with some embodiments.

FIG. 8B illustrates another graph of currents for charging a battery, in accordance with some embodiments. As shown in FIG. 8B, lines 802 through 810 may correspond to lines 802 through 810 in FIG. 8A. Yet further, currents corresponding to curves 812 through 818 may also correspond to currents provided in FIGS. 5A and 7. The currents in FIG. 8B may be determined, for example, in any manner described above in relation to FIGS. 1 through 7. For instance, computing device 100A and/or server 100B may determine a pulse time and a rest time of one or more of the currents in FIG. 8B to charge the battery to a target SOC. Further, the currents may include pulse times 404 and 408, and rest times 402 and 406 illustrated in FIG. 4. Yet further, the currents in FIG. 8B may be used to charge battery 302 to a 50% SOC, and 80% SOC, and/or a 100% SOC as shown in FIG. 3, among other possible SOCs.

As shown in FIG. 8B, the y-axis provides discharge capacity in Amp-hours (also referred to herein as "capacity" of a battery) and the x-axis provides cycle count, possibly indicative of the cycle life of the battery. Further, lines 802 through 818 may correspond to a number of currents used to charge a battery.

As shown in FIG. 8B, a current may be determined to charge a battery. For example, the current corresponding to line 812 may be a current with a 2.0C rate, a 60 second pulse time, and a 20 second rest time. In some instances, this current may correspond to the current associated with condition 1 of FIG. 5A and/or condition 1 of FIG. 7. As such, using this current, the battery may be charged to a target SOC in a given time, such as a 50% SOC in 20.1 minutes, an 80% SOC in 32.8 minutes, and/or a 100% SOC in 80.6 minutes. Yet, as shown in FIG. 8B, charging the battery with the current corresponding to line 812 may adversely impact the cycle life of the battery, possibly causing the battery to last for approximately 200 to 300 cycles. As such, current corresponding to lines 806 through 818 may be used to charge the battery to sustain the performance of the battery, slow cell aging, and/or preserve the cycle life of the battery.

In some embodiments, the current corresponding to line 814 may be a current with a 1.5C rate, a 60 second pulse time, and a 10 second rest time. In some instances, this current may correspond to the current in condition 3 of FIG. 5A, condition 2 of FIG. 7, and/or condition 4 of FIG. 7. As such, using this current, the battery may be charged to a target SOC in a given time, such as a 50% SOC in 23.7 minutes, an 80% SOC in 38.4 minutes, and/or a 100% SOC in 91.0 minutes. As shown in FIG. 8B, charging the battery with the current corresponding to line 814 may sustain the performance of the battery, slow cell aging, and/or preserve the cycle life of the battery. As such, the current corresponding to line 814 may be selected to charge the battery to a target SOC.

In some embodiments, the current corresponding to line 816 may be a current with a 1.5C rate, a 60 second pulse time, and a 30 second rest time. In some instances, this current may correspond to the current in condition 4 of FIG. 5A, condition 5 of FIG. 7, and/or condition 19 of FIG. 7. As such, using this current, the battery may be charged to a target SOC in a given time, such as a 50% SOC in 29.4 minutes, an 80% SOC in 46.6 minutes, and/or a 100% SOC in 92.8 minutes. As shown in FIG. 8B, charging the battery with the current corresponding to line 816 may preserve the cycle life of the battery for approximately 700 to 800 cycles. As such, the current corresponding to line 816 may be selected to charge the battery to a target SOC.

In some embodiments, the current and voltage corresponding to line 818 may be a multi-step CC-CV. In some instances, this current and voltage may correspond to the current and voltage in condition 7 of FIG. 5A. As such, using this current and voltage, the battery may be charged to a target SOC in a given time, such as a 50% SOC in 34.2 minutes, an 80% SOC in 66.6 minutes, and/or a 100% SOC in 128.4 minutes. As shown in FIG. 8B, charging the battery with the multi-step CC-CV corresponding to line 818 may preserve the cycle life of the battery for approximately 1,300 to 1,600 cycles. As such, the current and voltage corresponding to line 818 may be selected to charge the battery to a target SOC.

In some embodiments, any of the currents corresponding to lines 802 through 818 may be used to charge a battery. For example, the currents corresponding to lines 806 through 810 and line 814 through 818 may be selected over the currents corresponding to lines 802, 804, and 812 to charge a battery, possibly to preserve the cycle life of the battery. Further, in some instances, the currents corresponding to lines 802, 804, and/or 812 may be used to charge a battery to a 50% SOC. Yet further, the currents corresponding to lines 806 through 810 and lines 814 through 818 may be used to charge the battery from the 50% SOC to an 80% SOC, among other possibilities.

In some embodiments, a battery may be charged with any of the currents corresponding to lines 814 through 818. In some instances, a user may provide an indication to charge the battery using the current corresponding to line 816. In particular, using this current, the battery may be charged to the 50% SOC in 29.4 minutes, which may be approximately 5 to 6 minutes longer than the time it takes to charge the battery using the current corresponding to line 814. As such, the user may be provided with information indicating that charging the battery using the current corresponding to line 816 to the 50% SOC may take approximately 5 to 6 minutes longer. Yet, the user may be provided with additional information indicating that by using the current corresponding to line 816, the cycle life of the battery may be preserved for approximately 100 to 300 more cycles. As such, the user may select the current corresponding to line 818.

Figure 9A:
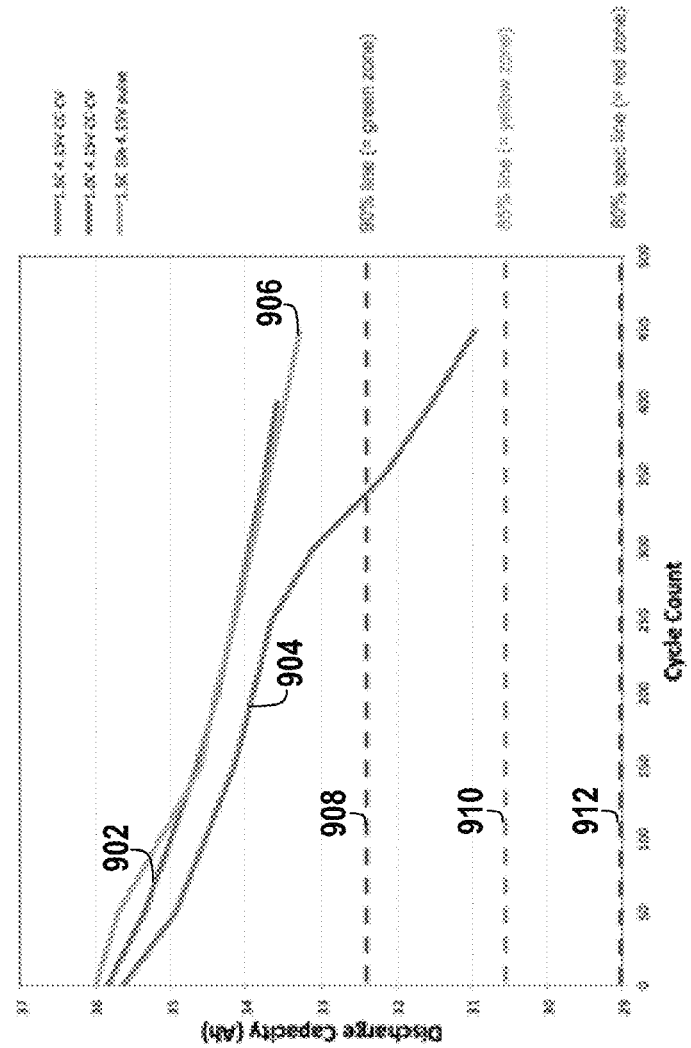
FIG. 9A illustrates an example graph of currents for charging a battery in view of thresholds, in accordance with some embodiments.

FIG. 9A illustrates an example graph of currents for charging a battery in view of thresholds, in accordance with some embodiments. As shown in FIG. 9A, the currents for charging the battery may correspond to currents provided in FIG. 5A and FIG. 7. The currents may be determined, for example, in any manner described above in relation to FIGS. 1 through 8B. For instance, computing device 100A and/or server 100B may determine a pulse time and a rest time of one or more of the currents in FIG. 9A to charge the battery to a target SOC. Further, the currents may include pulse times 404 and 408, and rest times 402 and 406 illustrated in FIG. 4. Yet further, the currents in FIG. 9A may be used to charge battery 302 to a 50% SOC, an 80% SOC, and/or a 100% SOC as shown in FIG. 3, among other possible SOCs.

As shown in FIG. 9A, the y-axis provides discharge capacity in Amp-hours (also referred to herein as "capacity" of the battery) and the x-axis provides cycle count, possibly indicative of the cycle life of the battery. Further, lines 902, 904, and 906 may correspond to a number of currents used to charge a battery such as a 36 Ah EV battery cell at 25 degrees Celsius. Yet further, thresholds 908, 910, and 912 may correspond to a number of zones indicative of the capacity and cycle life of the battery. In particular, the zone above threshold 908 (also possibly referred to as the "90% line") may be indicative of a "green zone" and the early stages of the battery's cycle life. Further, the zone between thresholds 908 and thresholds 910 (also possibly referred to as the "85% line") may be indicative of a "yellow zone" and the early to middle stages of a battery's cycle life. Yet further, the zone between thresholds 910 and line 912 (also possibly referred to the "80% line") may be indicative of a "red zone" and the later stages of a battery's cycle.

As shown in FIG. 9A, a current may be determined to charge a battery. For example, the current corresponding to line 902 may be a constant current with a 1.0C rate and constant voltage of 4.15 volts (also referred to herein as a 1.0C-4.15V CC-CV charging). As shown in FIG. 9A, charging the battery with the current corresponding to line 902 may preserve the cycle life of the battery for approximately 1,000 to 1,500 cycles. Yet, referring back to the electric vehicle scenario above, using a 1C rate to charge the battery to a 100% SOC may take approximately 8 or more hours.

In some instances, a current may be determined to charge a battery faster. For example, the current corresponding to line 904 may be a constant current with a 1.5C rate and a constant voltage of 4.15 volts (also referred to herein as a 1.5C-4.15V CC-CV charging method). As shown in FIG. 9A, charging the battery with the current corresponding to line 904 may adversely impact the cycle life of the battery, possibly causing the battery to last for approximately 400 to 600 cycles. In particular, line 904 exceeds threshold 908 after approximately 300 to 350 cycles and approaches line 910 in approximately 450 to 500 cycles.

As noted, in the electric vehicle scenarios above, the battery may be charged to a 100% SOC in 1 to 2 hours using the 1.5C-4.15V CC-CV charging. Yet, as shown in FIG. 9A, this current may adversely impact the cycle performance and/or the cycle life of the battery. In particular, charging the battery with the current corresponding to line 904 may require an owner of the electric vehicle to replace the battery every 1 to 2 years at unsustainable prices, e.g., $10,000-$20,000, such that owning the electric vehicle may be economically infeasible.

In some instances, a current may be determined to charge a battery faster and also preserve the cycle life of the battery.

For example, the current corresponding to line 906 may be a pulsed current with a 1.5C rate and a voltage of 4.15 volts (also referred to herein as a 1.5C-4.15V PC-V). As shown in FIG. 9A, charging the battery with the current corresponding to line 906 may preserve the cycle life of the battery for approximately 1,000 to 1,500 cycles, or possibly more. Further, in the electric vehicle scenarios above, the battery may be to charge to a 50% SOC in approximately 20 minutes and/or 80% SOC in approximately 30 minutes, among other possibilities. As such, charging the battery with the current corresponding to line 906 may sustain the performance of the battery, slow cell aging, and/or preserve the cycle life of the battery. Thus, the current corresponding to line 906 may be selected to charge a battery to a target SOC.

It should be noted that the 1.5C-4.15V PC-V may also have a pulsed voltage (also referred to herein as a 1.5C-4.15V PC-PV. For example, the voltage may be used to charge the battery. Referring back to FIG. 4, the voltage may be applied to the battery during pulse times 404 and 408. In some embodiments, the voltage may be applied to the battery during rest times 402 and 406. Yet, in some embodiments, the voltage may be applied to the battery during times independent or separately from the pulse times 404 and 408, and rest times 402 and 406, among other possibilities. As noted, pulse times 404 and 408 may range from 1 to 60 seconds, amongst other time ranges. Yet further, in some instances, pulse times 404 and 408 may be longer (e.g., 60 seconds) than rest times 402 and 406 (e.g., 20 seconds), among other possibilities.

Figure 9B:
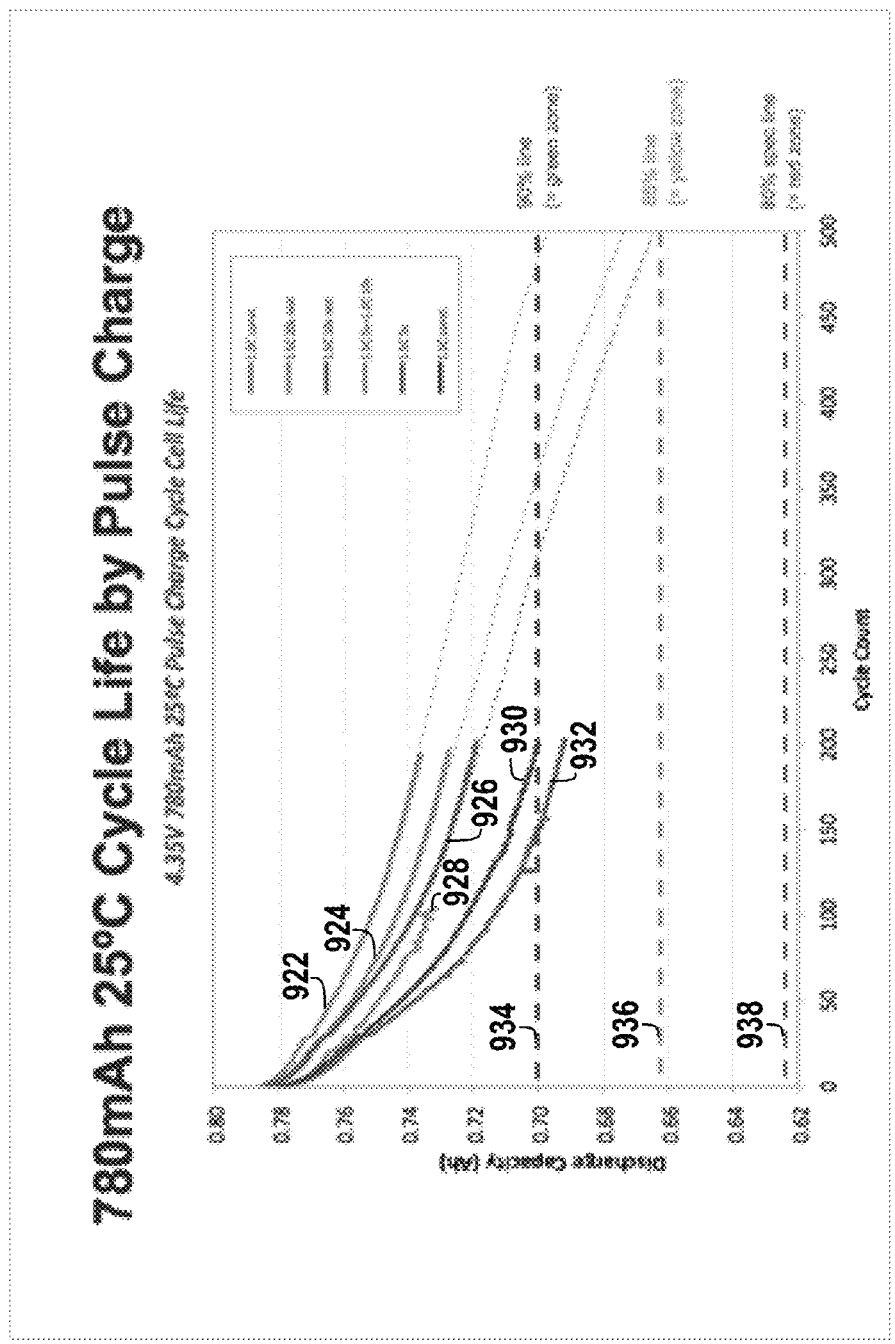
FIG. 9B illustrates another example graph of currents for charging a battery in view of thresholds, in accordance with some embodiments.

FIG. 9B illustrates another example graph of currents for charging a battery in view of thresholds, in accordance with some embodiments. As shown in FIG. 9B, the currents for charging the battery may correspond to currents provided in FIG. 5A and FIG. 7. The currents may be determined, for example, in any manner described above in relation to FIGS. 1 through 8B. For instance, computing device 100A and/or server 100B may determine a pulse time and a rest time of one or more of the currents in FIG. 9B to charge the battery to a target SOC. Further, the currents may include pulse times 404 and 408, and rest times 402 and 406 illustrated in FIG. 4. Yet further, the currents in FIG. 9A may be used to charge battery 302 to a 50% SOC, an 80% SOC, and/or a 100% SOC as shown in FIG. 3, among other possible SOCs.

As shown in FIG. 9B, the y-axis provides discharge capacity in milliamp-hours (also referred to herein as "capacity" of the battery) and the x-axis provides cycle count, possibly indicative of the cycle life of the battery. Further, lines 922 through 932 may correspond to a number of currents to charge a battery such as a 780 mAh battery at 25 degrees Celsius. Yet further, thresholds 934, 936, and 938 may correspond to a number of zones indicative of the capacity and cycle life of the battery. In particular, the zone above threshold 934 (also possibly referred to as the "90% line") may be indicative of a "green zone" and the early stages of the battery's cycle life. Further, the zone between threshold 934 and threshold 936 (also possibly referred to as the "85% line") may be indicative of a "yellow zone" and the early to middle stages of a battery's cycle life. Yet further, the zone between threshold 936 and threshold 938 (also possibly referred to the "80% line") may be indicative of a "red zone" and the later stages of a battery's cycle.

As shown in FIG. 9B, a current may be determined to charge a battery. For example, the current corresponding to line 922 may be a constant current with a 1.0C rate. As such, the battery may be charged to a 100% SOC in approximately 8 or more hours, possibly using the current corresponding to line 922. Yet, charging the battery with the current corresponding to line 922 may preserve the cycle life of the battery, possibly reaching or exceeding threshold 934 at approximately 450 to 500 cycles.

In some embodiments, the current corresponding to line 924 may be a current with a 1.5C rate and a 20 second pulse time. Further, the battery may be charged to a 100% SOC in faster than charging with current corresponding to line 922. Yet further, charging the battery with the current corresponding to line 924 may preserve the cycle life of the battery, possibly reaching or exceeding threshold 934 at approximately 350 to 400 cycles.

In some embodiments, the current corresponding to line 926 may be a current with a 1.5C rate and a 30 second pulse time. In some instances, this current may correspond to the current in condition 4 of FIG. 5A, condition 5 of FIG. 7, and/or condition 19 of FIG. 7. As such, using this current, a battery may be charged to a target SOC in a given time, such as a 50% SOC in 29.4 minutes, an 80% SOC in 46.6 minutes, and/or a 100% SOC in 92.8 minutes. Further, charging the battery with the current corresponding to line 926 may preserve the cycle life of the battery, possibly reaching or exceeding threshold 934 at approximately 300 to 350 cycles.

In some embodiments, the current corresponding to line 928 may be a current with a 1.5C rate and a 5 second rest period. Yet further, the current corresponding to line 928 may also change to a 1C rate and a 20 second rest period. In some instances, the battery may be charged to a 100% SOC faster than charging with the current corresponding to line 924. Further, charging the battery with the current corresponding to line 928 may preserve the cycle life of the battery, possibly reaching or exceeding threshold 934 at approximately 250 to 300 cycles.

In some embodiments, the current corresponding to line 930 may be a current with a 1.5C rate and a 5 second rest time. In some instances, this current may correspond to the current associated with condition 3 of FIG. 5A, condition 2 of FIG. 7, and/or condition 4 of FIG. 7. As such, using this current, a battery may be charged to a target SOC in a given time, such as a 50% SOC in 23.7 minutes, an 80% SOC in 38.4 minutes, and/or a 100% SOC in 91.0 minutes. Yet, as shown in FIG. 9B, charging the battery with the current corresponding to line 930 may adversely impact the cycle life of the battery, possibly reaching or exceeding threshold 934 in approximately 150 to 200 cycles. As such, currents associated with lines 922 through 926 may be selected to charge a battery to a target SOC.

In some embodiments, the current corresponding to line 932 may be a current with a 1.5C rate and a constant current with a full pulse time and no rest time, such that the current is continuously high. In some instances, this current may correspond to the current associated with condition 2 of FIG. 5A. As such, using this current, a battery may be charged to a target SOC in a given time, such as a 50% SOC in 20.3 minutes, an 80% SOC in 34.5 minutes, and/or a 100% SOC in 88.9 minutes. Yet, as shown in FIG. 9B, charging the battery with the current corresponding to line 932 may adversely impact the cycle life of the battery, reaching or exceeding threshold 934 after approximately 150 to 200 cycles. As such, currents associated with lines 922 through 926 may be selected to charge a battery to a target SOC.

D. Charging the Battery to the Target SOC with the Pulse Time and the Rest Time of the Current The method 200 continues at block 208 with charging, by the computing device, the battery to the target SOC with the pulse time and the rest time of the current. The battery may be charged to the target SOC with the pulse time and the rest time of the current, for example, in any manner described above in relation to FIGS. 1 through 9B. For example, computing device 100A may charge a battery to the target SOC with the pulse time and the rest time of the current. Further, the pulse time and the rest time of the current may be pulse times 404 and 408, and rest times 402 and 406 illustrated in FIG. 4. Further, the currents may be used to charge battery 302 to a 50% SOC, and 80% SOC, and/or a 100% SOC as shown in FIG. 3, among other possible SOCs.

VI. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    selecting, by a computing device, a target state of charge (SOC) from a set of predefined SOCs, wherein at least one of the predefined SOCs is less than a 100% SOC;
    determining, by the computing device, a state of a battery, wherein the state of the battery is indicative of one or more characteristics of the battery;
    based at least on the state of the battery, the computing device determining a pulse time and a rest time of a current for charging the battery to the target SOC; and
    the computing device charging the battery to the target SOC with the pulse time and the rest time of the current.

2. The method of claim 1, wherein the target SOC is greater than or equal to a 50% SOC and less than or equal to a 80% SOC of the battery, wherein based at least on the state of the battery, the computing device determining the pulse time and the rest time of the current for charging the battery to the target SOC comprises:
    determining the pulse time from a time range of 1 to 60 seconds; and
    determining the rest time from the time range of 1 to 60 seconds.

3. The method of claim 1, wherein selecting, by the computing device, the target SOC from the set of predefined SOCs comprises:
    receiving input data indicative of a time period available to charge the battery; and
    based at least on the available time period, selecting the target SOC from the set of predefined SOCs.

4. The method of claim 1, wherein based at least on the state of the battery, the computing device determining the pulse time and the rest time of the current for charging the battery to the target SOC comprises:
    determining a first pulse time and a first rest time of a first current for charging the battery to the target SOC;
    determining a second pulse time and a second rest time of a second current for charging the battery to the target SOC;
    determining the battery is capable of being charged by the first current for a greater number of charging cycles than the second current; and
    selecting the first pulse time and the first rest time of the first current for charging the battery to the target SOC.

5. The method of claim 1, wherein determining, by the computing device, the state of the battery comprises determining a number of charging cycles completed by the battery, wherein based at least on the state of the battery, determining the pulse time and the rest time of the current for charging the battery to the target SOC comprises:
    determining, based at least on the number of charging cycles completed by the battery, a first pulse time and a first rest time of a first current for charging the battery to the target SOC, wherein the battery is capable of being charged by the first current for at least 300 additional charging cycles.

6. The method of claim 1, wherein the one or more characteristics of the battery comprises a number of charging cycles completed by the battery, and wherein the number of charging cycles completed by the battery comprises at least one of the following charging cycle ranges: 0 to 100 charging cycles, 101 to 300 charging cycles, and 301 to 500 charging cycles.

7. The method of claim 1, wherein the one or more characteristics of the battery comprises a capacity of the battery, and wherein the capacity of the battery ranges from less than 85% to greater than or equal to 95%.

8. The method of claim 1, wherein the one or more characteristics of the battery comprises an impedance of the battery, and wherein the impedance of the battery ranges from 105% to 200%.

9. A computing device comprising:
    a processor;
    a non-transitory computer-readable medium having stored thereon program instructions that, when executed by the processor, cause the computing device to perform a set of functions, the set of functions comprising:
        selecting a target state of charge (SOC) from a set of predefined SOCs, wherein at least one of the predefined SOCs is less than a 100% SOC;
        determining a state of a battery, wherein the state of the battery is indicative of one or more characteristics of the battery;
        based at least on the state of the battery, determining a pulse time and a rest time of a current for charging the battery to the target SOC; and
        charging the battery to the target SOC with the pulse time and the rest time of the current.

10. The computing device of claim 9, wherein the target SOC is greater than or equal to a 50% SOC and less than or equal to a 80% SOC of the battery, wherein based at least on the state of the battery, determining the pulse time and the rest time of the current for charging the battery to the target SOC comprises:
    determining the pulse time from a time range of 1 to 60 seconds; and
    determining the rest time from the time range of 1 to 60 seconds.

11. The computing device of claim 9, wherein selecting the target SOC from the set of predefined SOCs comprises:
    receiving input data indicative of a time period available to charge the battery; and
    based at least on the available time period, selecting the target SOC from the set of predefined SOCs.

12. The computing device of claim 9, wherein based at least on the state of the battery, determining the pulse time and the rest time of the current for charging the battery to the target SOC comprises:
    determining a first pulse time and a first rest time of a first current for charging the battery to the target SOC;
    determining a second pulse time and a second rest time of a second current for charging the battery to the target SOC;

determining the battery is capable of being charged by the first current for a greater number of charging cycles than the second current; and selecting the first pulse time and the first rest time of the first current for charging the battery to the target SOC.

13. The computing device of claim 9, wherein determining the state of the battery comprises determining a number of charging cycles completed by the battery, wherein based at least on the state of the battery, determining the pulse time and the rest time of the current for charging the battery to the target SOC comprises:

determining, based at least on the number of charging cycles completed by the battery, a first pulse time and a first rest time of a first current for charging the battery to the target SOC, wherein the battery is configured to be charged by the first current for at least 300 additional charging cycles.

14. The computing device of claim 9, wherein the one or more characteristics of the battery comprises a number of charging cycles completed by the battery, and wherein the number of charging cycles completed by the battery comprises at least one of the following charging cycle ranges: 0 to 100 charging cycles, 101 to 300 charging cycles, and 301 to 500 charging cycles.

15. A non-transitory computer-readable medium having stored thereon program instructions that when executed by a processor cause performance of a set of functions in connection with an electric vehicle battery, the set of functions comprising:

selecting a target state of charge (SOC) from a set of predefined SOCs, wherein at least one of the predefined SOCs is less than a 100% SOC;

determining a state of the electric vehicle battery, wherein the state of the electric vehicle battery is indicative of one or more characteristics of the electric vehicle battery;

based at least on the state of the electric vehicle battery, determining a pulse time and a rest time of a current for charging the electric vehicle battery to the target SOC; and charging the electric vehicle battery to the target SOC with the pulse time and the rest time of the current.

16. The non-transitory computer-readable medium of claim 15, wherein the target SOC is greater than or equal to a 50% SOC and less than or equal to a 80% SOC of the electric vehicle battery, wherein based at least on the state of the electric vehicle battery, determining the pulse time and the rest time of the current for charging the electric vehicle battery to the target SOC comprises:

determining the pulse time from a time range of 1 to 60 seconds; and determining the rest time from the time range of 1 to 60 seconds.

17. The non-transitory computer-readable medium of claim 15, wherein selecting the target SOC from the set of predefined SOCs comprises:

receiving input data indicative of a time period available to charge the electric vehicle battery; and based at least on the available time period, selecting the target SOC from the set of predefined SOCs.

18. The non-transitory computer-readable medium of claim 15, wherein the electric vehicle battery is configured to power an electric vehicle from a first location to a second location, wherein selecting the target SOC from the set of predefined SOCs comprises:

determining a distance for the electric vehicle to travel from the first location and to the second location;

based at least on the determined distance, selecting the target SOC from the set of predefined SOCs.

19. The non-transitory computer-readable medium of claim 15, wherein the electric vehicle battery is configured to power an electric vehicle from a first location to a second location, wherein selecting the target SOC from the set of predefined SOCs comprises:

determining a time period for the electric vehicle to travel from the first location and to the second location;

based at least on the determined time period, selecting the target SOC from the set of predefined SOCs.

20. The non-transitory computer-readable medium of claim 15, wherein based at least on the state of the electric vehicle battery, determining the pulse time and the rest time of the current for charging the electric vehicle battery to the target SOC comprises:

determining a first pulse time and a first rest time of a first current for charging the electric vehicle battery to the target SOC;

determining a second pulse time and a second rest time of a second current for charging the electric vehicle battery to the target SOC;

determining the electric vehicle battery is capable of being charged by the first current for a greater number of charging cycles than the second current; and selecting the first pulse time and the first rest time of the first current for charging the electric vehicle battery to the target SOC.

21. The non-transitory computer-readable medium of claim 15, wherein determining the state of the electric vehicle battery comprises determining a number of charging cycles completed by the electric vehicle battery, wherein based at least on the state of the electric vehicle battery, determining the pulse time and the rest time of the current for charging the electric vehicle battery to the target SOC comprises:

determining, based at least on the number of charging cycles completed by the battery, a first pulse time and a first rest time of a first current for charging the battery to the target SOC, wherein the electric vehicle battery is configured to be charged by the first current for at least 300 additional charging cycles.

22. The non-transitory computer-readable medium of claim 15, wherein the one or more characteristics of the electric vehicle battery comprises a number of charging cycles completed by the electric vehicle battery, and wherein the number of charging cycles completed by the electric vehicle battery comprises at least one of the following charging cycle ranges: 0 to 100 charging cycles, 101 to 300 charging cycles, and 301 to 500 charging cycles.

* * * * *